United States Patent
Schoner et al.

(10) Patent No.: US 9,654,908 B2
(45) Date of Patent: May 16, 2017

(54) WIRELESS ENTITY TRACKING AND PROTECTION

(71) Applicant: Trimble Navigation Limited, Sunnyvale, CA (US)

(72) Inventors: Bernd Schoner, Cambridge, MA (US); Ravikanth Pappu, Cambridge, MA (US); John Biondo, Thornton, CO (US); Peter Fredriksson, Sollentuna (SE); Linda Chase, Littleton, CO (US); Alan Sharp, Superior, CO (US)

(73) Assignee: Trimble Inc., Sunnyvale, CA (US)

(*) Notice: Subject to any disclaimer, the term of this patent is extended or adjusted under 35 U.S.C. 154(b) by 0 days.

(21) Appl. No.: 15/091,504

(22) Filed: Apr. 5, 2016

(65) Prior Publication Data

US 2016/0295356 A1    Oct. 6, 2016

Related U.S. Application Data

(63) Continuation of application No. 13/899,361, filed on May 21, 2013, now Pat. No. 9,305,196, which is a continuation-in-part of application No. 13/669,365, filed on Nov. 5, 2012, now Pat. No. 9,400,902.

(60) Provisional application No. 61/722,057, filed on Nov. 2, 2012, provisional application No. 61/650,433, filed on May 22, 2012.

(51) Int. Cl.
| | | |
|---|---|---|
| *G08B 13/14* | (2006.01) |
| *H04W 4/00* | (2009.01) |
| *G06K 7/10* | (2006.01) |
| *G01S 5/02* | (2010.01) |
| *H04W 64/00* | (2009.01) |
| *H04W 4/02* | (2009.01) |
| *H04W 4/04* | (2009.01) |

(52) U.S. Cl.
CPC .......... *H04W 4/008* (2013.01); *G01S 5/0257* (2013.01); *G06K 7/10366* (2013.01); *H04W 64/00* (2013.01); *H04W 4/028* (2013.01); *H04W 4/043* (2013.01)

(58) Field of Classification Search
CPC ................................................ G06K 7/10366
USPC ..... 340/572.1, 568.1, 8.1, 539.11; 455/456.1
See application file for complete search history.

(56) References Cited

U.S. PATENT DOCUMENTS

| | | |
|---|---|---|
| 5,977,913 A | 11/1999 | Christ |
| 6,339,709 B1 | 1/2002 | Gladwin et al. |
| 7,123,149 B2 | 10/2006 | Nowak et al. |
| 7,293,645 B2 | 11/2007 | Harper et al. |
| 7,633,392 B2 | 12/2009 | Neuwirth et al. |
| 7,791,455 B1 | 9/2010 | Maclean et al. |
| 7,843,343 B2 | 11/2010 | Thorn |
| 7,885,763 B2 | 2/2011 | Havens et al. |
| 8,073,795 B2 | 12/2011 | Honisch |

(Continued)

*Primary Examiner* — Eric M Blount
(74) *Attorney, Agent, or Firm* — Kilpatrick Townsend & Stockton LLP

(57) ABSTRACT

A method for tracking an entity is disclosed. In one embodiment, a plurality of messages conveying an identification of an entity are received using a wireless identification component. A geographic location of the wireless identification component is determined by a position determining component wherein the geographic location describes a respective geographic location of the wireless identification component when each of the plurality of messages is received. A geographic position of the entity is determined based upon a known spatial relationship between the position determining component and the wireless identification component.

20 Claims, 15 Drawing Sheets

(56) References Cited

U.S. PATENT DOCUMENTS

| | | |
|---|---|---|
| 8,423,042 B2 | 4/2013 | Markhovsky et al. |
| 8,477,013 B2 | 7/2013 | Sarma et al. |
| 8,660,914 B2 | 2/2014 | Soppera et al. |
| 8,698,637 B2 | 4/2014 | Raichman |
| 8,903,416 B1 | 12/2014 | Perkins et al. |
| 2005/0253704 A1 | 11/2005 | Neuwirth |
| 2006/0055552 A1 | 3/2006 | Chung et al. |
| 2006/0055564 A1 | 3/2006 | Olsen et al. |
| 2007/0075898 A1 | 4/2007 | Markhovsky et al. |
| 2008/0133127 A1 | 6/2008 | Havens |
| 2008/0198001 A1 | 8/2008 | Sarma et al. |
| 2009/0177603 A1 | 7/2009 | Honisch |
| 2011/0167010 A1 | 7/2011 | Soppera et al. |
| 2011/0199211 A1 | 8/2011 | Campero et al. |
| 2012/0253862 A1 | 10/2012 | Davidson |
| 2012/0286933 A1 | 11/2012 | Hsiao |
| 2013/0080049 A1 | 3/2013 | Brucker et al. |
| 2013/0127596 A1 | 5/2013 | Jain et al. |
| 2013/0169415 A1 | 7/2013 | Bellows et al. |
| 2013/0231760 A1 | 9/2013 | Rosen et al. |
| 2013/0314210 A1 | 11/2013 | Schoner et al. |

400

```
┌─────────────────────────────────────────────────────────────────────┐
│ USING A TRACKING INFRASTRUCTURE COMPRISING AT LEAST ONE DATA RECEIVER TO │
│ DETECT A TRACKED ENTITY COMPRISING A FIRST ASSET CLASS USING A FIRST SENSING │
│                          TECHNOLOGY                                 │
│                              410                                    │
└─────────────────────────────────────────────────────────────────────┘
                                 │
                                 ▼
┌─────────────────────────────────────────────────────────────────────┐
│ GENERATING A TRACKING DATA REPORT BY THE AT LEAST ONE TRACKING DATA RECEIVE │
│           CONVEYING THE LOCATION OF THE TRACKED ENTITY              │
│                              420                                    │
└─────────────────────────────────────────────────────────────────────┘
                                 │
                                 ▼
┌─────────────────────────────────────────────────────────────────────┐
│ RECEIVING THE TRACKING DATA REPORT BY A MULTI-MODAL ENTITY TRACKER CONFIGURED │
│ TO STORE THE TRACKING DATA REPORT AND TO RECEIVE AND STORE A SECOND TRACKING │
│ DATA REPORT OF A SECOND TRACKED ENTITY COMPRISING A SECOND ASSET CLASS WHICH │
│           IS CONVEYED VIA THE TRACKING INFRATSTRUCTURE              │
│                              430                                    │
└─────────────────────────────────────────────────────────────────────┘
```

```
┌─────────────────────────────────────────────────────────────────────┐
│  RECEIVING A PLURALITY OF MESSAGES CONVEYING AN IDENTIFICATION OF AN │
│   ENTITY USING A WIRELESS IDENTIFICATION COMPONENT OF A SENSOR UNIT  │
│                                 1110                                 │
└─────────────────────────────────────────────────────────────────────┘
                                   │
                                   ▼
┌─────────────────────────────────────────────────────────────────────┐
│     DETERMINING A GEOGRAPHIC LOCATION OF THE WIRELESS IDENTIFICATION │
│   COMPONENT BY A POSITION DETERMINING COMPONENT OF THE SENSOR UNIT   │
│   WHEREIN THE GEOGRAPHIC LOCATION DESCRIBES A RESPECTIVE GEOGRAPHIC  │
│    LOCATION OF THE WIRELESS IDENTIFICATION COMPONENT WHEN EACH OF THE│
│                  PLURALITY OF MESSAGES IS RECEIVED                   │
│                                 1120                                 │
└─────────────────────────────────────────────────────────────────────┘
                                   │
                                   ▼
┌─────────────────────────────────────────────────────────────────────┐
│   DETERMINING A GEOGRAPHIC POSITION OF THE ENTITY BASED UPON A KNOWN │
│    SPATIAL RELATIONSHIP BETWEEN THE POSITION DETERMINING COMPONENT AND│
│              THE WIRELESS IDENTIFICATION COMPONENT                   │
│                                 1130                                 │
└─────────────────────────────────────────────────────────────────────┘
```

FIG. 11

WIRELESS ENTITY TRACKING AND PROTECTION

CROSS REFERENCE TO RELATED U.S. APPLICATIONS

This application is a continuation of U.S. patent application Ser. No. 13/899,361, filed May 21, 2013, which is a continuation-in-part of U.S. patent application Ser. No. 13/669,365, filed Nov. 5, 2012, the entire disclosures of which are incorporated by reference herein in their entirety. U.S. patent application Ser. No. 13/899,361 claims priority to U.S. Provisional Application No. 61/650,433, filed May 22, 2012 and 61/722,057, filed Nov. 2, 2012, the entire disclosures of which are incorporated by reference herein in their entirety.

BACKGROUND

Presently, entities such as people and assets (machines, tools, materials, objects, etc.) are not often tracked on a construction sites. However, in some limited senses, Global Navigation Satellite System (GNSS) location sensing technologies (e.g., GNSS receivers) may be used to track some assets while other controls such as a Radio Frequency Identification (RFID) tag may be used in conjunction with an entry control access to track entry or exit of a person and/or asset through a control point, such as a gate. Conventionally, however, if tracking of people and/or assets occurs at all, only a single location sensing technology such as GPS, Wi-Fi, or RFID appears to be used in isolation for tracking the tracked entity.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIG. 4 is a flowchart of a method for tracking an entity in accordance with at least one embodiment.

FIG. 11 is a flowchart of a method for tracking an entity in accordance with various embodiments.

DESCRIPTION OF EMBODIMENTS

Figure 1:
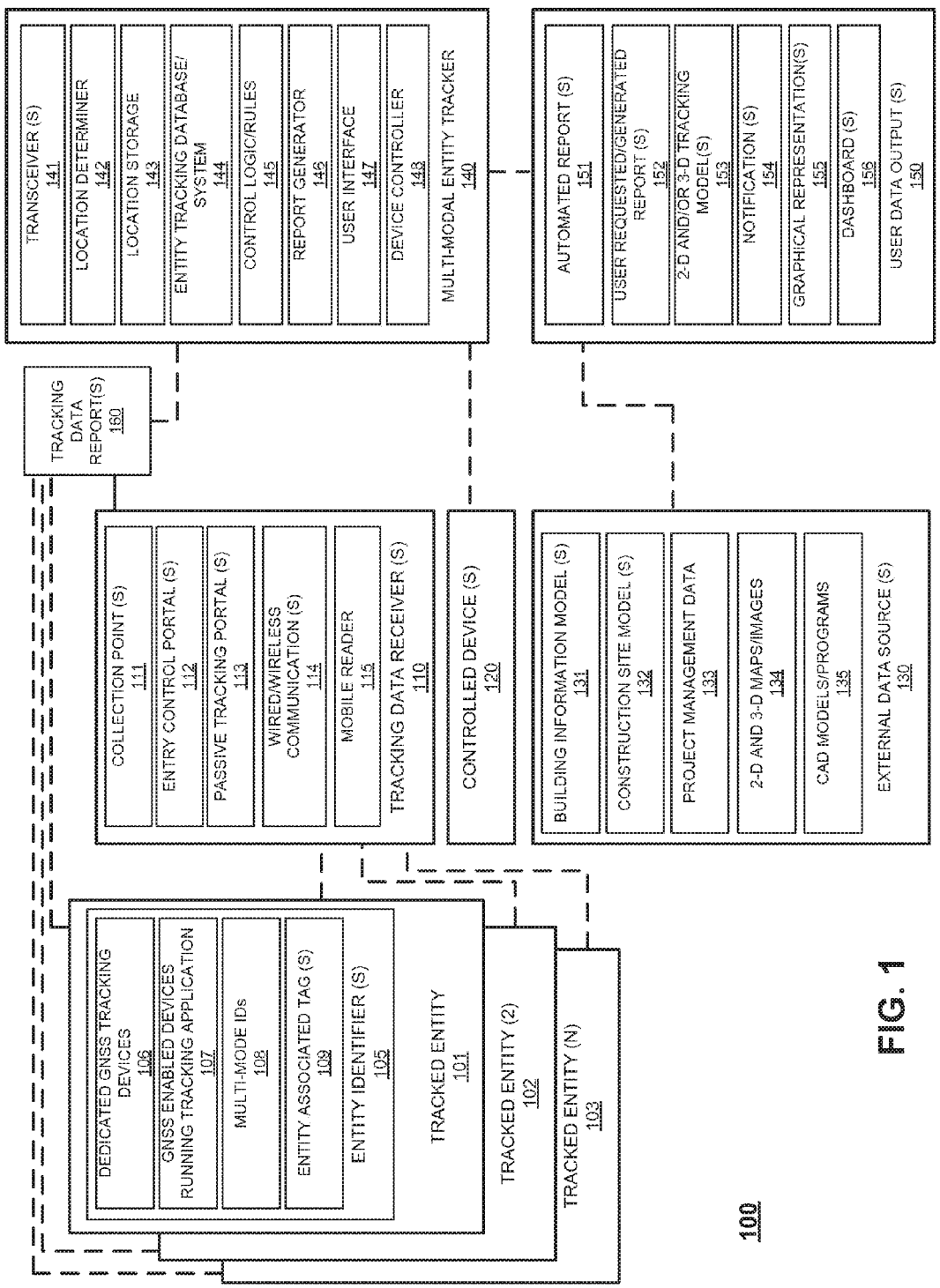
FIG. 1 is a diagram of an example multi-modal construction site entity tracking system, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "receiving," "determining," "using," "selectively modulating," "coupling," "selectively generating," "identifying," "displaying," or the like, often (but not always) refer to the actions and processes of a computer system or similar electronic computing device such as, but not limited to, a display unit and/or a lifting device sensor unit or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s). For the purpose of the present discussion, the term "free flow" location sensing refers to the sensing of assets without the active participation of an individual, Such as by using an RFID reader and/or GNSS sensor that sense the location without a person taking active participation in the process. Additionally, the term "sensing for secure access" refers to of a person or asset at a secure check point that grants access only if proper credentials are presented. For the purpose of the following discussion, the term "reverse RFID" refers to a system that is based upon mobile RFID readers interactive with stationary RFID tags and uses relevant information stored on the RFID tags to determine the location of a tracked entity. The term "forward RFID" refers to a system that is based on RFID tags placed on mobile tracked entities.

OVERVIEW OF DISCUSSION

The following discussion will begin with a description of an example multi-modal entity tracking system in accordance with at least one embodiment. Discussion continues with a description of example applications enabled by a multi-modal entity tracking system in accordance with various embodiments follows. Then, a discussion of an example implementation of an example implementation of a multi-modal entity tracking system in accordance with various embodiments follows. Discussion then turns to a discussion of an example computer system environment upon which embodiments of a multi-modal entity tracking system can be implemented. Finally, discussion of methods, systems, and devices, for tracking an entity, in accordance with various embodiments, will follow.

Example Multi-Modal Entity Tracking System

Herein, multi-modal tracking of tracked entities (people and assets) is described where at least two types of location sensing technology are employed for locating and tracking entities such as people and/or assets on a construction site as part of a multi-modal construction site entity tracking system ("System"). An overview of this system is depicted by the multi-modal tracking and display infrastructure (e.g. system 100) shown in FIG. 1. All of the features illustrated in FIG. 1 may not be present in every embodiment of the system, and some embodiments may include additional or alternative features other than those illustrated. Other location sensing technologies, which utilize only a single mode, may also be used in conjunction with multi-modal location sensing technologies in some embodiments. That is to say, although the system employs multi-modal location sensing and tracking of some people and/or assets may also track some people and/or assets using only a single mode of location sensing technology. One or more entity tracking databases are included within or accessed by the system and include various characteristics that are associated with a person or asset. For example, a person may have one or more characteristics such as a name, employer, employee number, type of trade, qualification level within a trade (e.g., apprentice, journeyman, master, or the like), certification status, immigration status, security clearance level, biometric(s), physical description, photograph, assigned supervisor, emergency contact info, current tracked location, authorized locations, and history log of locations, among other characteristics. An asset may have one or more characteristics such as asset type, when acquired, history of use, delivery time, service information, physical description, photograph, serial number or other identifying information, current tracked location, authorized locations, and history log of locations, among other characteristics. Additionally, one or more modes of location sensing technology may be associated with a person or asset such that when a report is received from a mode of location sensing technology that is assigned to a person or asset, a database entry for the person or asset can be accessed, updated, and reported out if there is some violation of a rule noted by the system.

FIG. 1 is a diagram of an example multi-modal construction site entity tracking system 100, in accordance with an embodiment. It is noted that the components of system 100 shown in FIG. 1 may be implemented on a single device, multiple devices, or in a cloud computing environment in accordance with various embodiments. As described in FIG. 1, the system 100 tracks a tracked entity (e.g., tracked entity 101, tracked entity 2 (e.g., tracked entity 102 of FIG. 1), tracked entity N (e.g., 103 of FIG. 1)) via one or more entity identifiers 105 carried by or affixed to, or otherwise in close proximity to the tracked entity 101. An entity identifier 105 reports to either a tracking data receiver 110 or transceiver 141 of the multi-modal entity tracker 140. For example, passive entity trackers (RFID tags) may be read by a tracking data receiver 110 which then conveys a report about the tracked entity 101 to multi-modal entity tracker 140.

Entity Identifier(s)

A tracked entity 101 may be identified by a multi-mode identification 108 (e.g., a card or small device that includes a plurality of wireless communication capabilities such as several RFIDs that operate respectively on several different frequencies and/or an active RFID reader for corresponding with RFID tags at known locations on a construction site). Such a card/device may include standoffs to separate passive RFIDs from the body of a person to prevent interference. By corresponding with several tags at known locations an active RFID reader used as an entity tracker (e.g., multi-mode ID 108 of FIG. 1) can use trilateration (by time of flight, signal strength measurement, and/or phase measurement) to ascertain its location in three dimensions relative to the known locations of the corresponded RFID tags. A multi-mode ID 108 has many modes of operation which, when registered with the system and to the person, can be accessed and read by various tracking data receivers 110 such as portals that are associated with the system 100 (e.g., one RFID read when entering an entry control portal which controls overall access to the construction site in general, another different type of RFID for tracking by passive portals within a building on the construction site, and an RFID reader for corresponding with RFID tags located at fixed known location). It is noted that entity identifiers 105 can implement one or more location sensing technologies in a single device, or use multiple devices in various embodiments.

Entity associated ID tags 109 are additional RFID tags associated with a tracked entity 101, and with respect to a person, for example, may be affixed to safety equipment such as a fall harness, reflective vest, hard hat, ear protection, eye protection, safety shoes, tool(s) or the like. Similarly, the person may carry a dedicated GNSS location sensing technology or electronic device (e.g., smart phone) running a GNSS location sensing application; either or both of which report sensed location information to the system when in adequate view of GNSS signals. Active devices such as a dedicated GNSS tracking device 106 and a GNSS Enabled Device 107 running a tracking application may report directly to multi-modal entity tracker 140 or report through a wired or wireless communication with a tracking data receiver 110 (e.g., a WIFI router). In at least one embodiment, the data stored on entity identifiers 105 is encoded according to a security algorithm. In one embodiment, a multi-mode identification 108 utilizes, for example, a secure RFID medium and an unsecure RFID medium in the same package. The secure RFID medium is used for secure access to areas which use security sensing technologies to restrict access while the unsecure RFID medium is used for tracking tracked entity 101 in unsecure areas. It is further noted that RFID tags used as entity associated tags 109, or some other aspect of an entity identifier 105, can be embedded in a suitable form factor for workers in particular environments in accordance with various embodiments. For example, an RFID tag may be embedded in clothing articles such as badges, lanyards, hard hats, arm pouches, shoulder pads, etc. in accordance with various embodiments.

Tracking Data Receiver(s)

Some types of tracking data receivers 110 include one or more reader technologies for interacting with one or more location sensing technologies that may be carried by or affixed to an entity such as tracked entity 101. These reader technologies can interrogate these location sensing technologies (i.e., read one or more RFID tags) and/or be interrogated by the location sensing technology (such as if an RFID reader is coupled with an asset). Tracking data receivers 110 may be in the form of entry control portals 112 and passive tracking portals 113. Fixed location tracking data receivers 110 in the form of entry control portals 112 may be disposed at locations which are choke points and which may also include physically obstructive traffic control devices (e.g., turnstiles or lockable doors/gates). Fixed location tracking control portals 113 may simply be readers located at points where people and assets are required to freely pass through (e.g., doorways, stairwells, hallways) as they proceed from one area of a site/building into another. These portals interact with the location sensing technology carried by or affixed to an entity such as tracked entity 101 and report the interactions through a transceiver to a central data collection, management, and control portion of the system which is shown in FIG. 1 as multi-modal entity tracker 140. These portals, as well as collection point (s) 111 and passive tracking portal (s) 113, may also utilize other sensing technologies including, but not limited to cameras, infra-red cameras, 3-D scanners, motion sensors, door open/closed sensors, optical sensors, biometric sensors, etc. For the sake of the present discussion, the term "free-flow location sensing" is directed to a sensing technology in which tracked entities (101, 102, 103, etc.) are detected without the necessity of any interaction or intervention by the tracked entity (101, 102, 103, etc.). Non-fixed tracking data receivers include dedicated GNSS tracking devices 106 and/or GNSS enabled devices 107 (e.g., a smart phone) that run a tracking application which is enabled to operate and report location information to the system 100 at least when within a geofence associated with the construction site. Other types of tracking data receivers 110 include collection points which may be located or set up at emergency assembly collection points, which may or may not be a fixed location, and wired or wireless communications such as WIFE routers. In some embodiment, a mobile reader 115 can be used to identify a tracked entity 101 at an emergency assembly point or other location. For example, the mobile reader 115 can be a handheld device such as a barcode scanner, magnetic stripe reader, or RFID reader that is used at an entry, exit, and/or emergency assembly collection point of a site.

In one example, various access controls are utilized with portals. For example an entry control portal 112 for a site may wirelessly read a person's ID, take an image of the person, and also require input of biometric information (e.g., a fingerprint scan) to permit initial access to the site through a turnstile. For the purpose of the following discussion, the term "secure access location sensing technology" refers to a sensing technology in which a tracked entity 101 actively interacts with the system to positively identify the tracked entity 101. For example, swiping a magnetic identification card, entering a passcode, or providing biometric information comprise non-limiting examples of secure access location sensing technology used in accordance with various embodiments. Passive tracking portals 113 may then track the person throughout other portions of the site. Upon exit from the site, similar protocols as required for entry may be required to positively ensure identification of the person as the depart the site.

Multi-Modal Entity Tracker

The multi-modal entity tracker 140 may include one or more transceivers 141 for communication with one or more tracking data receivers 110, which may operate on differing types of communication that can be wireline or wireless (e.g., wired/wireless communication(s) 114). Thus, a tracked entity 101 that includes multiple modes of entity identifiers 105 may be tracked based on a plurality of the modes that get reported to the multi-modal entity tracker 140. Based on a particular location of a tracking data receiver 110, which is located at a known or knowable location, a location determiner 142 associates a location with a report received from a tracking data receiver 110. The known or knowable location may be a latitude/longitude (and possibly elevation), may be referenced to a local coordinate system, and/or may be associated with regions or locations on a site map and/or building information as several non-limiting examples. A known location is determined in advance or at time of installation of a tracking data receiver 110, while a knowable location is one that may be determined after installation, such as via trilateration from other known locations (e.g., with trilateration from signals of other portions of system 100 that are located in known locations) or via GNSS signals received by the tracking data receiver 110. The determined location associated with a tracked entity 101 can be stored within a location storage 143 (e.g., memory, disk storage, or the like) for later access and/or in conjunction with an entry in an entity tracking database/system 144 which may be linked with or integrated with an enterprise resource planning system, human resources management system and/or other database/system. Rules associated with a tracked entity 101 for which a report is received can then be applied (e.g., send a report if this entity is in a location that it is restricted from being in). A report generator 146 can access the location storage 143 and the entity tracking databases 144 to automatically generate reports 151 and/or generate user-specified reports 152 upon user interaction with a user-interface 147 that is provided by the multi-modal entity tracker 140. The report generator 146 may also populate or update a dashboard 156 or other monitoring display or graphical representation 155 with a graphical image used or accessed by a person such as a site manager, foreman, or security guard, among others. The report generator 146 may also push notifications 154 such as email message, pages, faxes, and/or text messages to pre-selected devices. Reports (e.g., automated reports 151 and user requested/generated reports 152) and notifications 154 may be based on control/logic rules that are configured via the user interface 147. Based on the control logic/rules, the device controller 148 may control operation of one or more devices in response to a location reported regarding a tracked entity 101. For example, positive feedback (i.e., green light, pleasant tone, door/gate/turnstile being unlocked/remaining unlocked, image/video recording initiated, biometric device being enabled) may be initiated by the device controller 148 through control of a controlled device (e.g., colored light, annunciator, lock, gate control, turnstile control, biometric identification device, camera, microphone) as an authorized entity (e.g., tracked entity 101) traverses a portal while negative feedback (e.g., red light, warning klaxon, door/gate/turnstile being locked/not unlocked, image/video recording initiated, biometric device being enabled) may be initiated by the device controller 148 through control of a controlled device when an unauthorized entity traverses or attempts to traverse a portal.

It is appreciated that all or portions of the multi-modal entity tracker 140 may be resident on a site or in a building being monitored or located remotely from a site or building being monitored.

User Data Outputs

User data outputs 150 from the multi-modal entity tracker 140 include automated reports 151, notifications 154, user requested/generated reports 152, 2-D and 3-D tracking models 153 that show current and/or historical tracked location information and may filter by any of a variety of characteristics such as a certain location on the construction site, certain trade, certain time period, etc. Other outputs can include information used to drive a dashboard 156 or a display on an electronic device (e.g., graphical representation(s) 155). In one embodiment, the data output to external data sources 130 can be filtered by multi-modal entity tracker 140 to, for example, only display the location of a single tracked entity 101 such as a person or piece of equipment. Other filtering applied by multi-modal entity tracker 140 can result in only a particular area of interest being displayed, or a particular class of tracked entities 101 (e.g., only people, tools, diagnostic equipment, etc.) being displayed. In another embodiment, the locations of tracked entities 101 are monitored to facilitate finding the tracked entities for later use. For example, the location at which a particular material is stored can be recorded and monitored using system 100. A worker who needs to use that material can be directed to the location at which it is located so that the worker does not have to lose time searching for the material. In another example, a user may need a particular tool and can be directed to where the tool is located so that time is not lost locating the equipment needed for a particular task.

External Data Sources

The multi-modal entity tracker 140 may communicate with provide information to and receive information from one or more external data sources and/or applications 130, such as, but not limited to, a Building Information Model (BIM) 131, a construction site model 132, an as built construction site model, a project management application (e.g., for access to material lists, worker schedules, and the like) 133, two-dimensional and three-dimensional maps or aerial images 134, and computer assisted drafting models and/or programs 135. For example, a map, or BIM 131, construction site model 132 (e.g., an as built construction site model), or CAD diagram 135 of a site or building may be populated with tracked entity (e.g., tracked entity 101) locations. Project management information, such as a schedule of construction events, may be used to automatically apply restrictions based on trade skill to certain regions of a site or building.

Controlled Devices

Controlled devices may include, but are not limited to, devices such as remotely controllable locks, cameras, microphones, localized feedback devices (lights, annunciators), microphones, controllable turnstiles, controllable gates, controllable biometric identification devices (finger print scanners, facial recognition scanners, voice recognition scanners), and the like.

Figure 2:
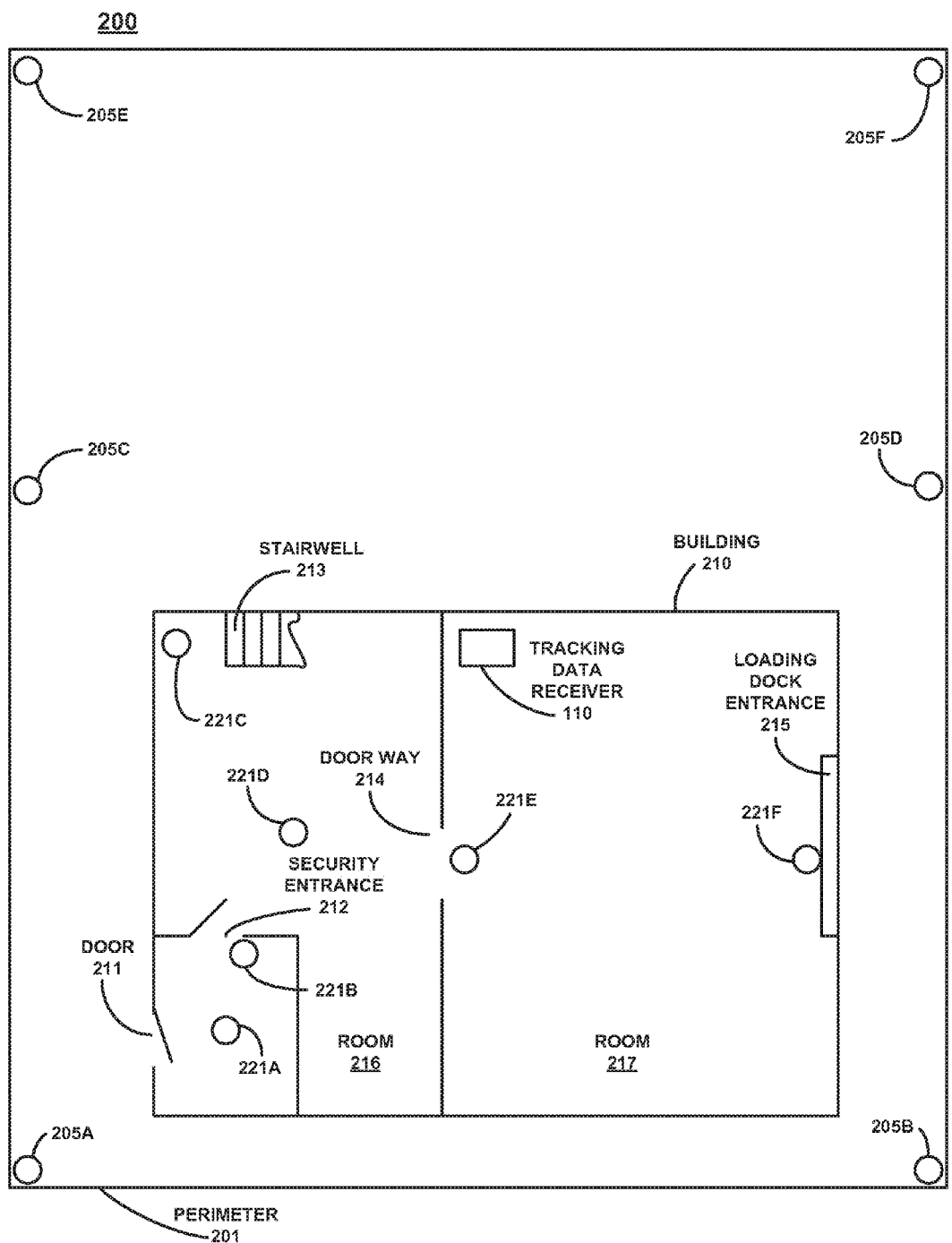
FIG. 2 is a diagram of a site implementing multi-modal entity tracking in accordance with an embodiment.

FIG. 2 is a diagram of an example site 200 in accordance with an embodiment. In FIG. 2, site 200 comprises a perimeter 201 with a plurality of sensors (e.g., 205A, 205B, 205C, 205D, 205E, and 205F) disposed at various locations of perimeter 201. In accordance with one or more embodiments, sensors 205A, 205B, 205C, 205D, 205E, and 205F are configured to detect a tracked entity 101 using any of the technologies described above with reference to FIG. 1 including, but not limited to, ultra high-frequency (UHF) radio-frequency identification (RFID), high-frequency (HF) RFID, near field communication (NFC), magnetic stripe, low-frequency (LF) RFID, barcode, quick response (QR) code, and GNSS position determination systems. In one embodiment, a long-range RFID medium is used to facilitate multi-modal entity tracker 140 in determining the location of a person in three dimensions. For the purpose of illustration, sensor 205D is located at a designated collection point for tracked entities in the case of an emergency such as a fire, earthquake, chemical spill, etc. in which it is desired to evacuate people and other assets at a location to account for all tracked entities.

Also shown in FIG. 2, is a building 210 which utilizes a plurality of sensors (e.g., 221A, 221B, 221C, 221D, 221E, and 221F) for entity tracking within building 210. It is noted that sensors 221A, 221B, 221C, 221D, 221E, and 221F can implement the same sensing technologies described above with reference to sensors 205A, 205B, 205C, 205D, 205E, and 205F. In one embodiment, tracking system 100 can implement one type of sensing technology outdoors such as around the perimeter 201 of site 200 (e.g., sensors 205A, 205B, 205C, 205D, 205E, and 205F), and use another type of sensing technology (e.g., RFID) indoors such as sensors 221A, 221B, 221C, 221D, 221E, and 221F. In building 210 are a door 211, a security entrance 212, a stairwell 213, a doorway 214, and a loading dock entrance 215. In accordance with an embodiment, sensor 221A is disposed at door 211. For the purpose of illustration only, it is assumed that door 211 is not a secured entrance. In one embodiment, sensor 221A may comprise a passive tracking portal as there is no need for secured access into building 210 via door 211. However, sensor 221B comprises an entry control portal 112 which is configured to identify a particular person using secure access location sensing technology, as described above, and allow access into room 216. In FIG. 2, sensor 221C is disposed proximate to stairwell 213 to monitor tracked entities 101 such as people or other assets which are going up/down stairs within building 210. It is noted that additional sensors (not shown) may be disposed at the other end of stairwell 213, as well to provide better monitoring within building 210. Furthermore, in one or more embodiments, sensors can be disposed within elevators or other lifting devices to monitor and report the location of tracked entities 101. Sensor 221D is disposed in the room 216 to monitor tracked entities 101 such as people and other assets. Sensor 221E is disposed at doorway 214 to monitor tracked entities 101 which are moving between room 216 and room 217. Sensor 221F is disposed at loading dock entrance 215 to monitor the movement of tracked entities 101 into/out of room 217 via loading dock entrance 215. It is noted that the number and placement of sensors 205A, 205B, 205C, 205D, 205E, and 205F as well as sensors 221A, 221B, 221C, 221D, 221E, and 221F is for the purpose of illustration only, and that fewer or greater numbers of these sensors may be used in accordance with various embodiments. In one embodiment, sensors 221A, 221C, 221D, 221E, and 221F are passive tracking portals which can monitor the free flow of tracked entities 101 within building 210 without the necessity of user intervention. It is noted that while the above description describes monitoring the location of tracked entities within a defined perimeter 201 (e.g., within site 200), various embodiments are not limited to entity monitoring within a given site alone. For example, vehicles equipped with a multi-mode identification 108 can use RFID tags and readers to facilitate monitoring the location of the vehicle within a given site, and can use a GNSS receiver to facilitate monitoring the location of the vehicle outside the given site.

In the embodiment of FIG. 2, sensors 205A, 205B, 205C, 205D, 205E, and 205F as well as sensors 221A, 221B, 221C, 221D, 221E, and 221F are communicatively coupled with tracking data receiver 110. In one embodiment, when a tracked entity 101 is detected by one of the sensors shown in FIG. 2, that event is time stamped (e.g., by the sensor itself, or by tracking data receiver 110). This data is sent to multi-modal entity tracker 140 and facilitates tracking the movement of a tracked entity 101, including the direction of movement, based upon the succession of time stamps from the various sensors which detected and monitored a tracked entity 101.

Example Applications Enabled by a Multi-Modal Entity Tracking System

Safety and Evacuation

Conventionally, in the case of an emergency or evacuation situation, the locations of personnel on a construction site are unknown. Furthermore, there is no means to know who is inside a building and whether a particular person has left the building.

In one embodiment, the system 100 tracks which floor and which section of a large building a person (e.g., tracked entity 101) is on by virtue of portals (e.g., entry control portals 112) at into/out of each floor or reader gated section of a building and active location technologies carried by the person (e.g., dedicated GNSS tracking device 106 and/or GNSS enable device running a tracking Application 107). As an example, referring to FIG. 2, tracking data receiver 110 can receive reports from sensors 205A, 205B, 205C, 205D, 205E, and 205F which describe when a tracked entity 101 has crossed perimeter 201 as well as providing the current location at which that tracked entity 101 is located at site 200. Similarly, sensors 221A, 221B, 221C, 221D, 221E, and 221F can provide this information to tracking data receiver 110 when a tracked entity 101 enters building 210.

The system 100 receives information from tracking data receivers 110 and/or GNSS devices (e.g., dedicated GNSS tracking devices 105A and/or GNSS enabled devices running tracking applications 107) and keeps track of when each person (e.g., tracked entity 101) enters or leaves a floor or controlled section (e.g., rooms 216 and 217 of FIG. 2) of a building (e.g., 210 of FIG. 2) or construction site (e.g., 200 of FIG. 2). In an emergency when a building (e.g., 210 of FIG. 2) or portion of a construction site (e.g., 200 of FIG. 2) needs to be evacuated, the tracking data receivers 110 and/or GNSS location sensing technology track the exit of people (e.g., tracked entity 101) from each floor, region, or portal controlled section of the building/construction site (e.g., building 210 and site 200 respectively) and report to the system 100 so that a responsible person (e.g., a guard) can tell if a building (e.g., 210 of FIG. 2) or evacuated area (e.g., room 216 of FIG. 2) is empty, and if not who is still in the building/area under evacuation and where they are located (e.g., where they were last reported as being). In this manner a guard or other responsible person such as a site foreman can watch an electronic display which counts down people who as they are exiting from the building (e.g., 210 of FIG. 2) and quickly be provided with an exception list in an emergency which indicates any persons still inside of a building (e.g., 210 of FIG. 2) and where they are located. Thus, each tracked entity 101 can be quickly accounted for and, if they have not yet evacuated the building 210 or site 200, can be more easily located for evacuation or rescue.

Figure 3:
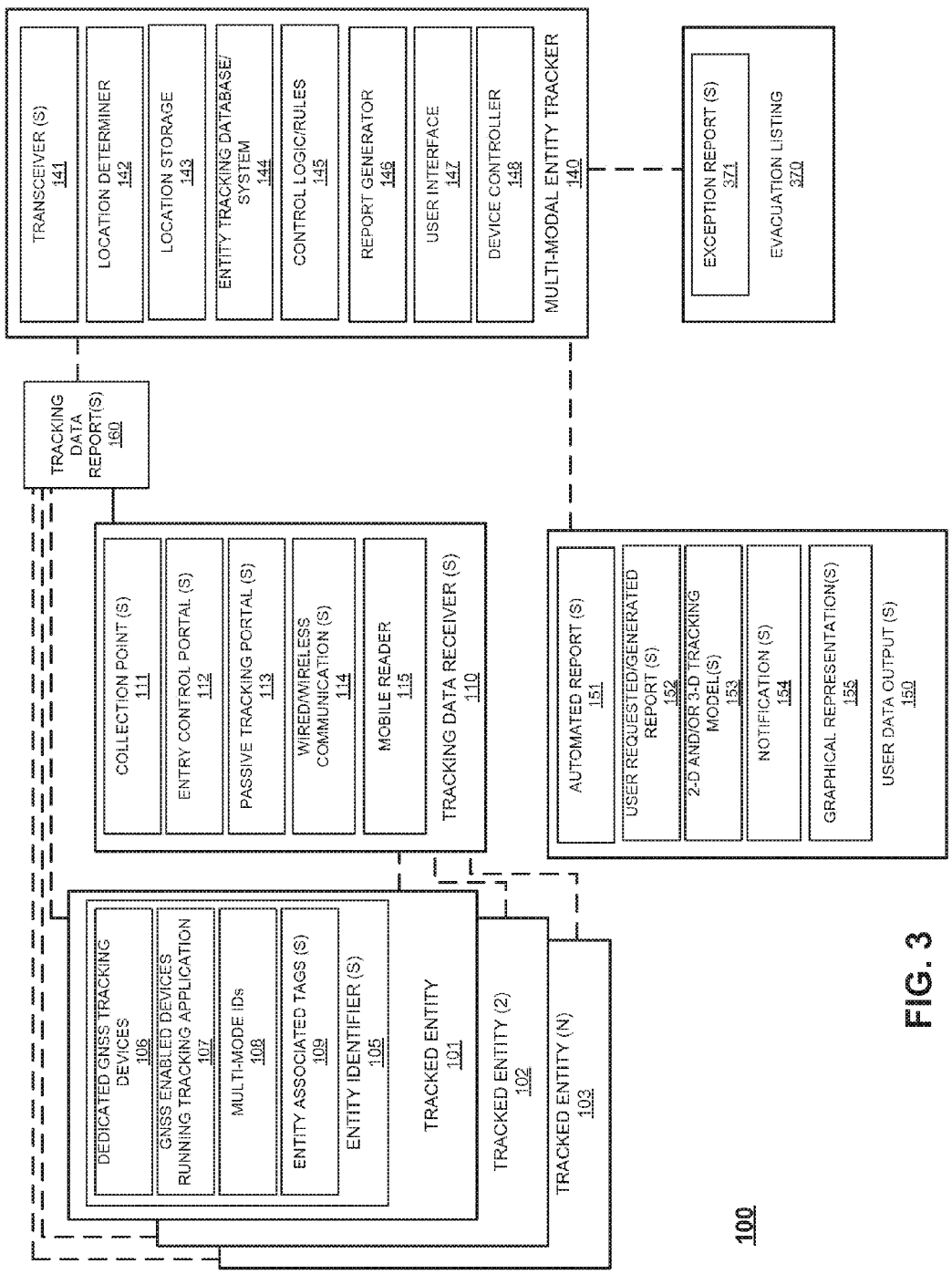
FIG. 3 is a block diagram of an example safety and evacuation system for monitoring the location of tracked entities in accordance with one embodiment.

Additionally, in some embodiments, the system 100 comprises one or more collection points 111 (e.g., sensor 205D of FIG. 2) which are readers typically located outside of a building and at which persons collect at following an evacuation or other announced emergency. Collection point 111 readers may include a backup source of power and/or communication to ensure robust functioning in an emergency situation which may take down a primary source of power and/or communication. Readers at a collection point 111 read the entity identification of a person (e.g., tracked entity 101) as the person checks in at the collection point 111. In this fashion the collection point 111 can produce an electronic evacuation listing (e.g., 370 of FIG. 3) (which may be displayed, printed, or electronically accessed/delivered) of people who have checked in at a particular collection point 111. This evacuation listing 370 replaces and is much faster than the conventional method of yelling out names and manually checking persons off of a list. Collection points 111 are also communicatively coupled as part of the system 100 and report information collected (e.g., via tracking data receiver 110, or directly to multi-modal entity tracker 140) so that a master list of collected people (e.g., evacuation listing 370) can be created as entity identifications of the people are wirelessly read at the collection points 111. In one embodiment, evacuation listing 370 comprises a master list of checked in persons from all collection points 111 at a construction site (e.g., 200 of FIG. 2) can be displayed, printed, or electronically accessed/delivered (e.g., such as a notification 154 to a manager, foreman, or emergency response unit). The speed of creating such an evacuation list 370 of collected persons also allows for exceptions (e.g., unaccounted for persons at a collection point) to be noted, reported, and dealt with more swiftly. In one embodiment, evacuation listing 370 further comprises an exception report 371 listing people or other tracked entities which have not yet checked into a collection point 111.

Among other situations, system 100 is useful in emergencies which require positive accounting of persons. Some non-limiting examples include fires or earthquakes which require evacuation of a building, and tornadoes which require gathering of all persons in a designated shelter. In one embodiment, a collection point 111 (e.g., sensor 205D of FIG. 2) may be placed at the entry of a tornado shelter. In some embodiments, the system 100 operates in a safety mode when manually triggered by a responsible entity (i.e., a guard, foreman, or manager), or may be automatically engaged in the safety mode in response to an emergency indication such as the pulling of a fire alarm on the construction site, occurrence of a power outage, receipt of a tornado warning, sensing of an earthquake, or the like. In the safety mode, the system 100 may automatically begin generating exception reports 371 (e.g., listing people who have not left the building and/or collected at a collection point 111) at pre-defined time intervals and then pushing such reports to designated location and/or entities. An exception report 371, in one embodiment, lists people whose whereabouts are unconfirmed (e.g., were known to have entered a site/building) but who have not been affirmatively noted as having left the site/building and/or who have not affirmatively checked in at a collection point 111. In some embodiment, even if portals (e.g., passive tracking portals 113) do not track that a person has left building 210 and/or site 200, the person may be noted by the system 100 to have exited the building 210 if they: a) check in at a collection point ill; and/or b) have their location tracked by another mode of location sensing technology such as by a dedicated GNSS tracking device 105A and/or a GNSS tracking application 107 on an electronic device that is carried with or associated with the person (e.g., tracked entity 101) and which reports to the system 100. In such a safety system there may be a priority of reports, and the highest priority may be associated with the person being checked in at a collection point 111. Thus, even if no passive tracking portal 113 (e.g., sensor 221F of FIG. 2) or location tracking device/application (e.g., 105A or 107 respectively) reported the person as having left a building, or an entity identifier 105 such as a dedicated GNSS device 105A was dropped by the person and continues to report their location as in the building 210 or at some other location of site 200, checking in at a collection point 111 will take priority with respect to affirmative tracking of the person's location.

For safety purposes, each time a person's ID is tracked, tags associated with safety equipment or tools associated with the person can also be scanned. This can determine if a person does not have a particular piece of safety equipment such as a hard hat, where such safety equipment is required.

Restricted Areas

In a relatively open construction project, such as prior to partitions and doors being installed, monitoring the access of restricted areas is all but impossible with conventional technologies.

The system 100 described herein, makes it possible to monitor access to restricted areas to include arrival, presence, and departure of monitored various tracked entities 101 such as people and assets (machines, tools, materials, objects). In the most general sense, restricted areas on a construction site are typically areas that are designated for access only by persons of a particular trade or level of training. Trades are skill sets possessed by one or more workers such as being a plumber, electrician, steel worker, framer, dry-wall worker, ceiling tile installer, concrete worker, heating ventilation and air conditioning installer, etc. Conflicts can occur when two trades are trying to accomplish work in an area simultaneously. For example, both electricians and plumbers may need access to the same portions of a structure to install wiring and pipes respectively. If both are trying to do their work in the same space at the same time they will get in the way of one another, work less efficiently, slow the schedule, and possibly anger one another. Moreover, sometimes it is required to perform skilled labor in a particular sequence to gain maximum efficiency. For instance, if ceiling tile were installed before wiring was placed in the ceiling, the tile would have to be removed by electricians, thus slowing the electricians and possibly damaging the tile. Similar conflicts may occur with various combinations of skilled trades and work sequencing. By restricting access of a trade to a designated area, such conflicts can be minimized or eliminated. However, simply saying that such restrictions exist does nothing to effectively track whether they are being abided by and does nothing to enforce the restrictions. Further, the restrictions may change frequently during the course of a project as work is completed and may become very specific to even include experience level restrictions within a trade (e.g., an apprentice electrician may not have access to a certain area where a particular electrical system needs to be installed, while a journeyman or master electrician will have such access). Such restrictions based on skill level within a trade or the particular type of trade required to perform an item of work may be based on building code regulations, union rules, contractual conditions, and the like. It is appreciated that access can also be restricted for other reasons than for these business process type reasons. For example, access can be restricted to promote safety. For example, if a fall hazard existed in an area, access could be limited only to iron workers. Likewise, access may be restricted based on security clearance of workers. For example, an electrician may require a certain level of security clearance to work in a particular part of a building being built for a government client.

The system 100 described herein allows a site manager or other entity to easily set and alter restrictions applied to particular floors or zones within floors. The restrictions can then be communicated to the workers. After this, the tracking of access control is then completely automated and hands off from the perspective of the site manager or other entity. That is, no one needs to be stationed or walking around to check on access. Instead, entry to, presence in, and departure from such restriction controlled areas is automatically tracked as persons and assets pass through entry control points 112 which include readers for detecting tracked entities 101. As described, the control points may be placed at choke points, such as doors, entry control portals 112 may limit passage to a single person at a time (e.g., a turnstile), may control direction of passage (e.g., turnstile), may limit access (such as by only unlocking a door once after a person's ID is read and/or biometrics are verified), and/or may allow persons and assets to freely flow through (e.g., passive tracking portals 113) while simply reading one or more trackable tags and/or identifications associated with the person or asset (e.g., multi-mode ID 108 or entity associated tag 109).

Referring again to FIG. 2, any one of, or all of, sensors 221A, 221B, 221C, 221D, 221E, and 221F can be configured as an entry control portal 112 to track and/or control the entry of workers into particular areas at particular times. Information read at the one or more control points by readers is centrally recorded, such as in a database (e.g., entity tracking database 144) and is available for future play back, for example so that a site manager or foreman can show where people have or have not been within a building being constructed. In conjunction with building information management BIM 131 software, the locations of tracked persons and assets can be displayed in real time and/or in replay on an electronic 2D or 3D representation of the building (e.g., 2-D and/or 3-D tracking models 153). Similarly, if a person or asset is noted by the system 100 as having entered an unauthorized area for that person or asset (e.g., a plumber in an electricians space, or parts for plumbing being delivered to a space where electrical work is being conducted) the system 100 can generate an exception report (e.g., automated report 151 or notification 154) which can be accessed by an authorized entity or automatically reported out to one or more designated entities (e.g., site manager, general contractor, sub-contractor). This allows almost instant notification and intervention, if required, to remedy a violation of a restricted area. In the event of an incident, collected information that has been stored can be played back for review. In accordance with at least one embodiment, BIM model(s) 131, construction site model(s) 132, 2-D and 3-D maps/images 134, and CAD model(s) 135 are used to generate 3-D representations of objects, spaces, and people on site 200 of FIG. 2. In at least one embodiment, different classes of tracked entities, objects, and spaces are color coded to convey characteristics of those tracked entities, objects, and spaces to a user of system 100.

Supervision and Control

Currently General Contractors have no means to verify whether a particular subcontractor is deploying resources on the job as contractually obligated.

For example, the report generator 146 of the multi-mode entity tracker 140 can generate a morning report (e.g., automated report 151) based on a comparison of tracked entities 101 present on the site at the beginning of the day as compared to the tracked entities 101 scheduled (such as in project management data 133 of FIG. 1) to be on a site at the beginning of the day. If, for example, 20 electricians are supposed to be on site at 8 A.M. to begin work, the general contractor can easily tell from such a report if some are missing if the tracked entities 101 show only 14 electricians. This can assist the general contractor in intervening early to call a sub-contractor and resolve a scheduling problem before much work time is lost.

In a similar manner a general contractor can run a report (e.g., a user requested/generated report 152) which describes how many people of a given trade were on site during a day, week, month, etc. and the number of hours that each of these persons of a given trade was on site. This can be then manually or automatically compared with reports or timesheets provided by a sub-contractor in order to note discrepancies such as over or under billing, or not performing to contracted levels.

Equipment, tools, building materials and other objects entering an area of a site (e.g., a floor of a building) can be automatically tracked by the system 100 so that it can be positively determined if necessary equipment, tools, and materials for a particular trade are in an area at a coordinated time when the persons with the skilled trade need such equipment, tools, and building materials for an assigned task. Additionally, a piece of equipment can be associated with a particular worker and it can be determined whether the worker and piece of equipment are co-located at a given time based upon, for example, tracking data report (s) 160 indicating that the worker and piece of equipment are essentially located at the same place. Thus, a notification 154 can be generated if the worker (e.g., tracked entity 101 of FIG. 1) and the piece of equipment (e.g., tracked entity 102 of FIG. 1) are not currently located at the same place. Additionally, as described above, system 100 can be used to determine the direction of travel of tracked entities such as within building 210 or at site 200 of FIG. 2. Thus, in one embodiment, if a worker (e.g., tracked entity 101 of FIG. 1) is detected moving in one direction, and an associated piece of equipment (e.g., tracked entity 102 of FIG. 1) is detected moving in a different direction, it may indicate that the piece of equipment is being stolen or misused. Thus, multi-modal entity tracker 140 can generate a notification 154 to alert a supervisor of this discrepancy. In another embodiment, system 100 can determine whether a worker is wearing required safety equipment in order to enter a dangerous area or perform a particular task. For example, by monitoring whether the worker (e.g., tracked entity 101 of FIG. 1) is wearing a safety harness (e.g., tracked entity 102 of FIG. 1), multi-modal entity tracker 140 can determine if the worker is entering a restricted area, or performing a particular task, with the necessary safety equipment. In one embodiment, entity identifiers 105 can also determine whether a worker has possibly been injured by incorporating, for example, a fall-detection sensor or a no-movement sensor in the worker's equipment.

A supervisor can be notified if a person enters an area that they have not had proper safety training to work within, and/or if the person does not have the proper safety equipment to be in a particular area. Similarly, a supervisor can be apprised if a worker enters a site but there is no immigration paperwork on file for the person. Additionally, a supervisor may use a dashboard type display (e.g., dashboard 165) or visualization of the site (e.g., 2-D and/or 3-D tracking model 153), or report request in order to quickly locate the whereabouts of a particular person on a site. Similarly, if an asset is reported as stolen or missing, a supervisor may use a dashboard type display (e.g., dashboard 165) or visualization of the site (e.g., 2-D and/or 3-D tracking model 153), or report request in order to quickly locate the whereabouts of a particular asset on a site or to determine how/when the asset left the site.

Project Management

Currently General Contractors do not have any means to monitor the personnel deployed on a job and use the data for project management and coordination between tasks and sub-contractors.

Using system 100, graphical play back of historical data (e.g., graphical representations 155) on a display device can allow for dispute resolution and analysis of workflow, as the tracked information in a building and on a construction site can provide almost complete picture of people and material flow in time and space with respect to a construction site. This allows analysis of work flow and work performance for timeline and efficiency purposes. It also allows comparison of an actual deployment of personnel and assets with a schedule/plan to determine whether and by how much they actual work and scheduled/planned work agree or differ. This can assist a project manager in determining the extent to which a project is on schedule/plan or behind and in determining how to rearrange a project schedule if work has slipped or gotten ahead of schedule.

Similarly, if a project is scheduled to have a certain number of man-hours for a trade, the hours spent on-site by particular trade can be tracked and accumulated and compared, using system 100, to scheduled burn rates of such hours to determine if a project is ahead or behind scheduled labor use.

A general contractor can use system 100 to share this information with one or more subcontractors by pushing out selected tracked entity data and/or by selectively allowing access to tracked entity data.

A general contractor can use a comparison of bid information with automatically tracked information related to skilled trades to determine if a sub-contractor over or under bid the amount of time it would take to perform a portion of work.

Personnel and Productivity Metrics

Currently General Contractors do not have any means to record the personnel deployed on a job and use the data retroactively for data mining and to improve processes and productivity.

In accordance with one embodiment, the report generator 146 of the multi-mode entity tracker 140 can generate a morning report (e.g., automated report 151) based on a comparison of tracked entities 101 present on the site at the beginning of the day as compared to the tracked entities 101 scheduled (such as in project management data 133 of FIG. 1) to be on a site at the beginning of the day. If for example 20 electricians are supposed to be on site at 8 A.M. to begin work, the general contractor can easily tell from such a report if some are missing if the tracked entities shows 20 plumbers and zero electricians. This can assist the general contractor in intervening early to call a sub-contractor and resolve a scheduling problem before much work time is lost. Similarly, tracked entity data can be utilized to automate time cards for tracked persons, as a complete record of on-site time of a tracked entity 101 is maintained.

Tracked entity information may be filtered by various categories (such as asset type or trade skill) and displayed on a 2D or 3D representation (e.g., 153) of a site and/or played back over time (a fourth dimension) to assist in visualization of work flow and productivity. This can facilitate evaluating work performance, as a comparison can be made of the time recorded for performing a task with some other metric such as a projected time for performing the task based upon past experience. As a result, it can be determined whether a task took more time than was anticipated and, if so, why the task took longer than expected.

In accordance with one or more embodiments, an entity identifier 105 is used to convey other data than just the identity of a tracked asset. For example, a tool or other piece of equipment can be configured to generate usage metrics which can be conveyed via entity identifier 105. For example, if a WIFI router is used as a passive tracking portal 113, additional data can be conveyed to tracking data receiver 110 such as the amount of time a tool has been operated, the operating parameters of that tool during a given time period, or self-diagnostic information which can be used to determine if the tool requires maintenance. Thus, multi-modal entity tracker 140 can generate a report (e.g., automated report 151 and/or user requested/generated report 152 which conveys the usage time of an asset, the work performance of that asset, etc. This information can be used to determine whether equipment is being properly used, maintained, or if the equipment is wearing out. For example, if it takes longer than anticipated to drill a hole using a drill (e.g., tracked entity 102) it may indicate that the drill bit is worn out, or that the motor of the drill is failing.

Example of Implementation of the Multi-Modal Entity Tracking System

The following discussion describes various aspects of the multi-modal tracking and display infrastructure (e.g., system 100) in accordance with at least one embodiment. It is noted that the following discussion is not intended to imply that the features described below are mutually interdependent, but rather can be implemented separately and/or concurrently, or in conjunction with one another.

In one embodiment, when a new worker arrives at a site (e.g., site 200 of FIG. 2, that worker will first participate in a registration/commissioning process. As an example, the worker's picture is taken and is entered into a database such as entity tracking database 144. Relevant personal data of the worker is either pulled up from a previously stored data record, or is entered on the spot. The worker is then given a unique RFID card (e.g., entity identifier 105). The RFID card comprises a unique electronic code. This code is also printed on entity identifier 105 in human readable form and, optionally, in other auto-identification technologies such as barcodes, 2-D/3-D barcodes, near field communication technology, GNSS position determination technology, etc. The electronic information on entity identifier 105 may also comprise multiple RFID codes such as encrypted codes, low frequency RFID codes, high-frequency-based RFID codes, ultra-high frequency based codes, quick response codes, magnetic swipe codes, etc.

Similarly, assets such as tools, materials, or other equipment can be associated with their own entity identifier 105 at various points in the supply chain. For example, materials can be tagged at the point of manufacture, at a distribution facility, or upon receipt at site 200. Capital equipment and tools likewise can be tagged at the manufacturer's site, at the contractor's site, or at site 200. Fixed readers and/or handheld readers can be used for tag commissioning. Once personnel and equipment is assigned a unique ID in system 100, specific equipment can be associated with specific personnel. For example, a particular worker may have a set of personal safety equipment issued such as a hard hat and a safety vest which are associated with that worker in multi-modal entity tracker 140. It is noted that the personal safety equipment, as well as other equipment assigned to a worker, may have the auto-identification technology embedded within in a suitable form factor.

Also during the registration process, the worker can enable an application on their smart phone, or other device, (e.g., 107 of FIG. 1) that is capable of sensing the location of the smart phone and transmit that information to multi-modal entity tracker 140 as a background process. In accordance with at least one embodiment, the background process is restricted to function only within a defined area such as within perimeter 201 of FIG. 2 unless configured to operate in a wider area.

Once the worker has completed the registration process, he is granted access to site 200 by scanning identity identifier 105 at an entrance to site 200 such as at a turnstile or other barrier. Alternatively, the workers can freely enter site 200 and a long range RFID reader monitors the flow of people onto site 200 and can generate an alert if a person tries to enter the site who is not properly registered. In another embodiment, security personnel can scan entity identifiers 105 using, for example, a handheld scanner such as mobile reader 115 and also verifying the workers' identities as well. Entity identifiers 105 do not need to be visible during the scanning, but can be hidden in clothing or other accessories. Upon scanning, the security personnel can see an image of the worker on a handheld screen and can verify that the scanned entity identifier 105 is in fact associated with that worker.

During the workday, the individual worker can access multiple different spaces. Each space has readers (e.g., passive tracking portals 113) places at its entrances and throughout the space as needed to provide better coverage of the space. As a worker passes through the spaces, reader antennas scan the entity identifiers 105 of the worker and pass the information on to entity tracking database 144. As a result, a correct record of the current location of the worker is maintained by multi-modal entity tracker 140. Because RFID sensors are installed at choke points such as entrances, they can monitor the flow of people and other assets as they move around site 200 without requiring explicit scanning by users. The use of multiple sensors throughout site 200 permit inferring the movement of workers and assets throughout the site and permit monitoring the location of all assets and personnel at a site at all times. Furthermore, in both free-flowing and secure access sensing situations, the co-location and co-movement of assets and people can be inferred. As an example, assets and people sensed at the same time in the same location can be assumed to be co-located or co-moving. Furthermore, as specific workers can be associated with specific pieces of equipment, multi-modal entity tracker 140 can determine whether un-authorized personnel are carrying equipment assigned to another worker.

Alerts (e.g., notification 154) can be generated when a particular combination of assets and personnel is determined to be in a particular location or zone within a site. For example, certain workers may not be allowed to enter certain work areas of site 200, or to use certain types of equipment. Alternatively, a particular piece of equipment may not be allowed to be used in a particular area of site 200. In another example, a certain type of material is not suitable for use with a particular piece of equipment. By monitoring the location of personnel, material, and other assets, multi-modal entity tracker 140 can determine if restricted conditions are being violated and generate notification (s) 154 to allow preventative action to be taken.

In accordance with one embodiment, entity identifiers 105 can include a wired data connection to another processor that is part of the tagged asset. For example, the entity associated tag (e.g., 109) on an expensive hand power tool may be connected to the tool main micro-processor. As the tool is being used, the main processor stores information about the usage of the tool, its maintenance work, possible failures, and general diagnostics in the RFID memory of the entity identifier 105. As the entity identifier is being sensed by a reader at site 200, this information is uploaded through the RFID interface. From the data, it can be inferred how much time the tool was used, when it was last serviced, if it requires maintenance, if it has a flaw creating a safety hazard, etc. Some assets may be tagged with other sensor tags to provide additional information about the state and/or usage of the asset. For example, a tag (e.g., entity identifier 105) on a hand tool may include a motion sensor, which determines if the tool is being handled at any one moment. Upon passing a reader disposed at site 200, the recent log of motion events is up-loaded through the RFID interface. From the data, it can be inferred how much time the tool was used since the last RFID read. Thus higher level information can be inferred from the raw sensing data which includes, but is not limited to: usage of a tool by a person; usage of materials by a worker, usage of a particular material with a particular tool or piece of equipment; amount of time spent on the site by a single worker or population of workers; materials used on a site by type of material, product codes, suppliers, and other characteristics; time spent by personnel and equipment to accomplish a particular task.

Furthermore, the job performance of a contractor or worker can be compared with another worker/contractor, or against some other metric. For example, in a high-rise construction process most floors are very similar in layout and build out. From the sensor data sent to multi-modal entity tracker 140 it can be inferred how long contractor A needed to build out floor X versus how long it took contractor B to build out floor Y. It can furthermore be determined how many and what kind of workers and equipment the respective contractors deployed. Given these statistics, the general contractors can select the better performer going forward and can issue recommendations to subcontractors as to how to go about a particular job.

When a worker enters areas where the worker's mobile device (e.g., 107 of FIG. 1) has a clear view of the sky, the GNSS tracking application on his/her mobile device provides the location information to multi-modal entity tracker 140 which creates a record of the work locations at specific times while within the pre-defined perimeter 201, or within a pre-determined geo-fence within site 200. It is possible to also associate GNSS tracking devices (e.g., 106 of FIG. 1) with assets and enable a similar functionality.

In the case of an emergency that requires the evacuation of a building or a portion of site 200, the worker will leave the area as quickly as possible and check in at a pre-designated collection point where his/her entity identifier 105 is scanned or automatically detected. While the evacuation is in process, the security supervisor can check how many workers are left in the evacuation zone and follow their progress, in real-time or near real-time, as the workers progress to exits and/or the collection point.

When a worker or asset enters the field of view of an RFID reader, the reader can generate a signal to a co-located camera to take a picture of the worker or asset, or a short sequence of frames to create a record of the action taken which can be stored by multi-modal entity tracker 140. Since the footage is associated with a particular tag which was read, the library of footage can easily be browsed and mined for the complete actions of a particular worker, sub-contractor, or trade, or of a particular asset.

Based on the recorded location information collected and stored by multi-modal entity tracker 140, a number of reports on individual workers can be generated including, but not limited to: work time spent in a particular area by a particular sub-contractor or worker, or by trade, or by seniority of a worker; access violations by a worker who is only granted access to specific spaces; comparison of declared and actual work time; identification of congestion in specific areas of a site (e.g., indoors and outdoors); correlation of the location and movement of people and the location and movement of materials and other assets; identification of inefficiencies in the building process due to sub-optimal personnel management or material management, etc.

System 100 can be used to create a coverage map of an individual performing specific tasks in a specific location of a site or building. For example, an inspector is required to inspect work product on all floors of a building as well as in multiple distinct areas on the outside of the building. Using system 100, a supervisor can verify that the inspector did indeed visit all required areas along with the time when the inspection was performed. Likewise, system 100 can confirm that a particular piece of equipment was used to perform the inspection.

FIG. 4 is a flowchart of a method 400 for tracking an entity in accordance with at least one embodiment. In operation 410 of FIG. 4, a tracking infrastructure comprising at least one data receiver is used to detect a tracked entity 101 comprising a first asset class using a first sensing technology and a second sensing technology.

In operation 420 of FIG. 4, a tracking data report is generated by the at least one tracking data receiver conveying a location of the tracked entity 101.

In operation 430 of FIG. 4, the tracking data report is received by a multi-modal entity tracker configured to store the tracking data report and to receive and store a second tracking data report of a second tracked entity (e.g., 102, 103, etc.) comprising a second asset class which is conveyed via the tracking infrastructure.

Figure 5:
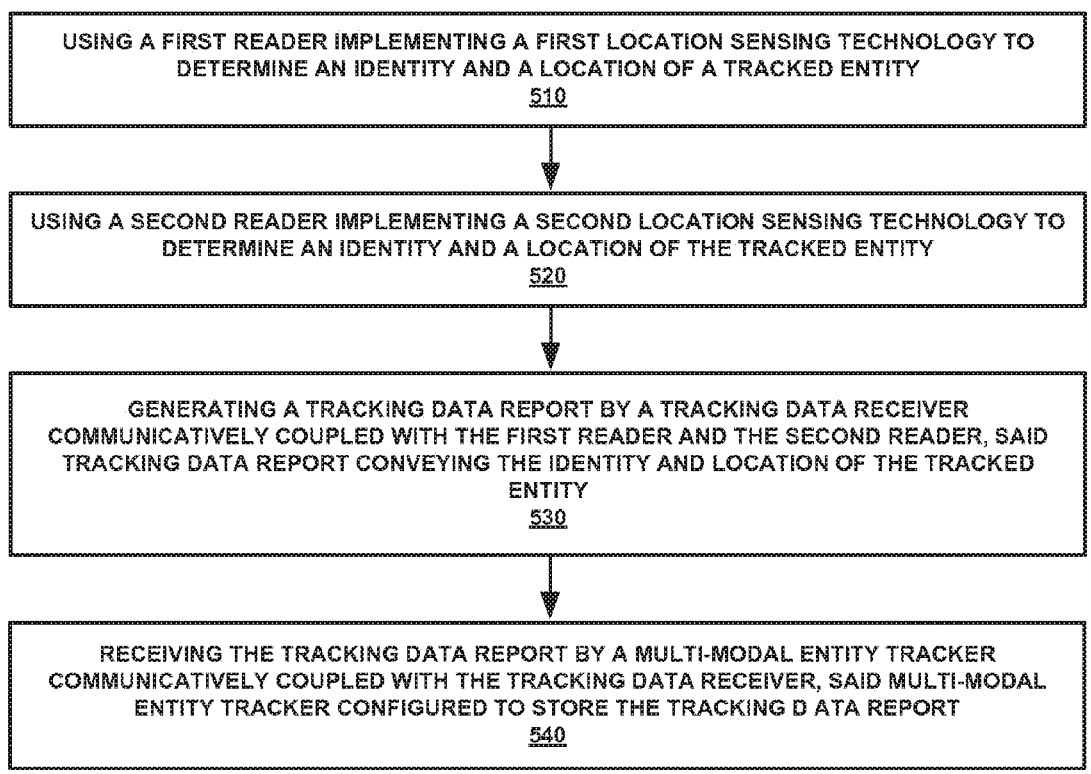
FIG. 5 is a flowchart of a method for tracking an entity in accordance with at least one embodiment.

FIG. 5 is a flowchart of a method 500 of a method for tacking an entity in accordance with at least one embodiment. In operation 510 of FIG. 5, a first reader implementing a first location sensing technology is used to determine an identity and a location of a tracked entity 101.

In operation 520 of FIG. 5, a second reader implementing a second location sensing technology is used to determine an identity and a location of the tracked entity 101.

In operation 530 of FIG. 5, a tracking data report is generated by a tracking data receiver communicatively coupled with the first reader and the second reader, the tracking data report conveying the identity and location of the tracked entity 101.

In operation 540 of FIG. 5, the tracking data report is received by a multi-modal entity tracker communicatively coupled with the tracking data receiver, the multi-modal entity tracker configured to store the tracking data report.

Example Computer System Environment

Figure 6:
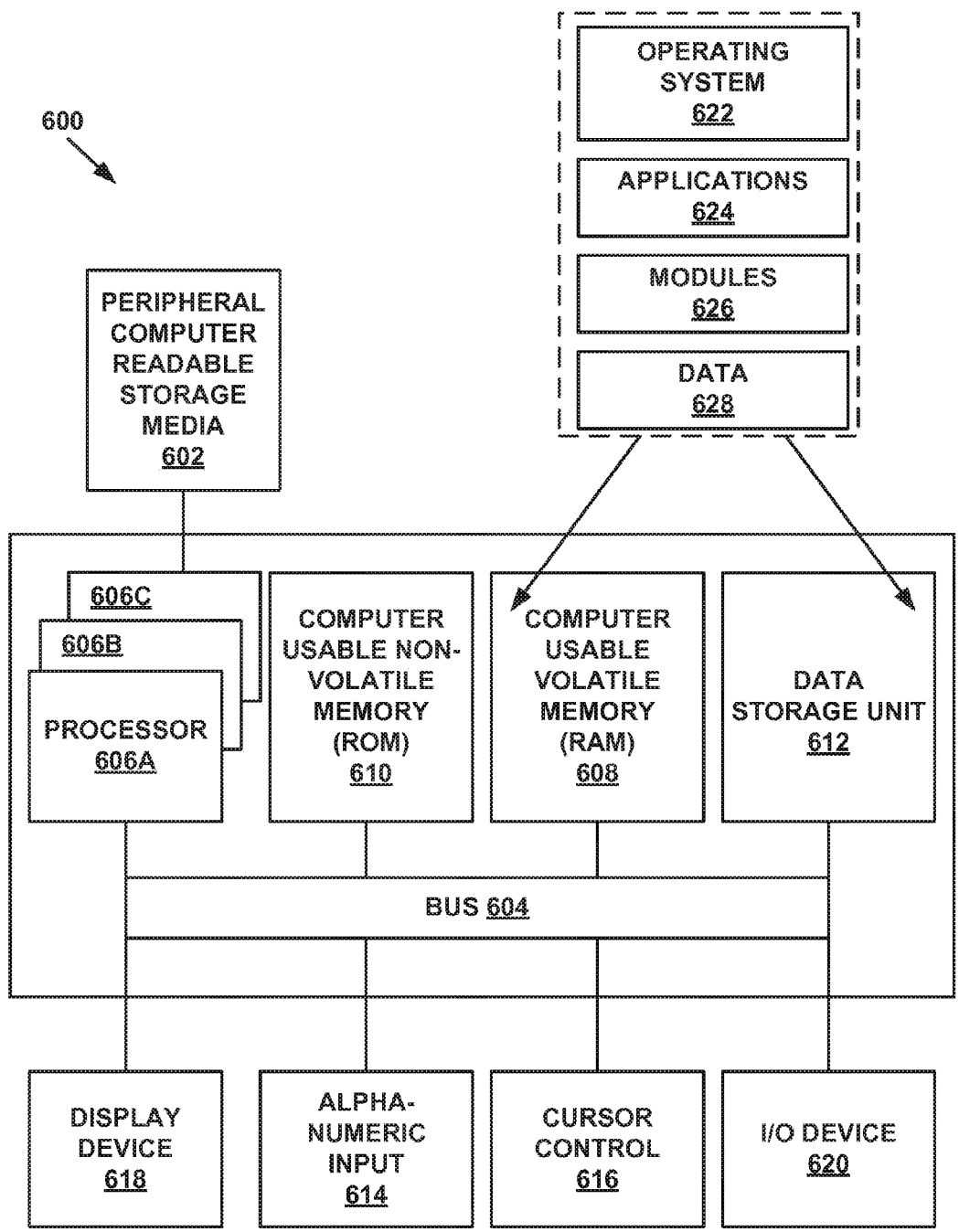
FIG. 6 is a block diagram of an example computer system on which various embodiments can be implemented.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 600 of FIG. 6 is well adapted to having peripheral computer-readable storage media 602 such as, for example, a floppy disk, a compact disc, digital versatile disc, universal serial bus "thumb" drive, removable memory card, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled to bus 604 for storing information and instructions for processors 606A, 606B, and 606C. System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. In one embodiment, system 600 also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. Optional cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands.

System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer readable storage media.

Entity Tracking

Figure 7:
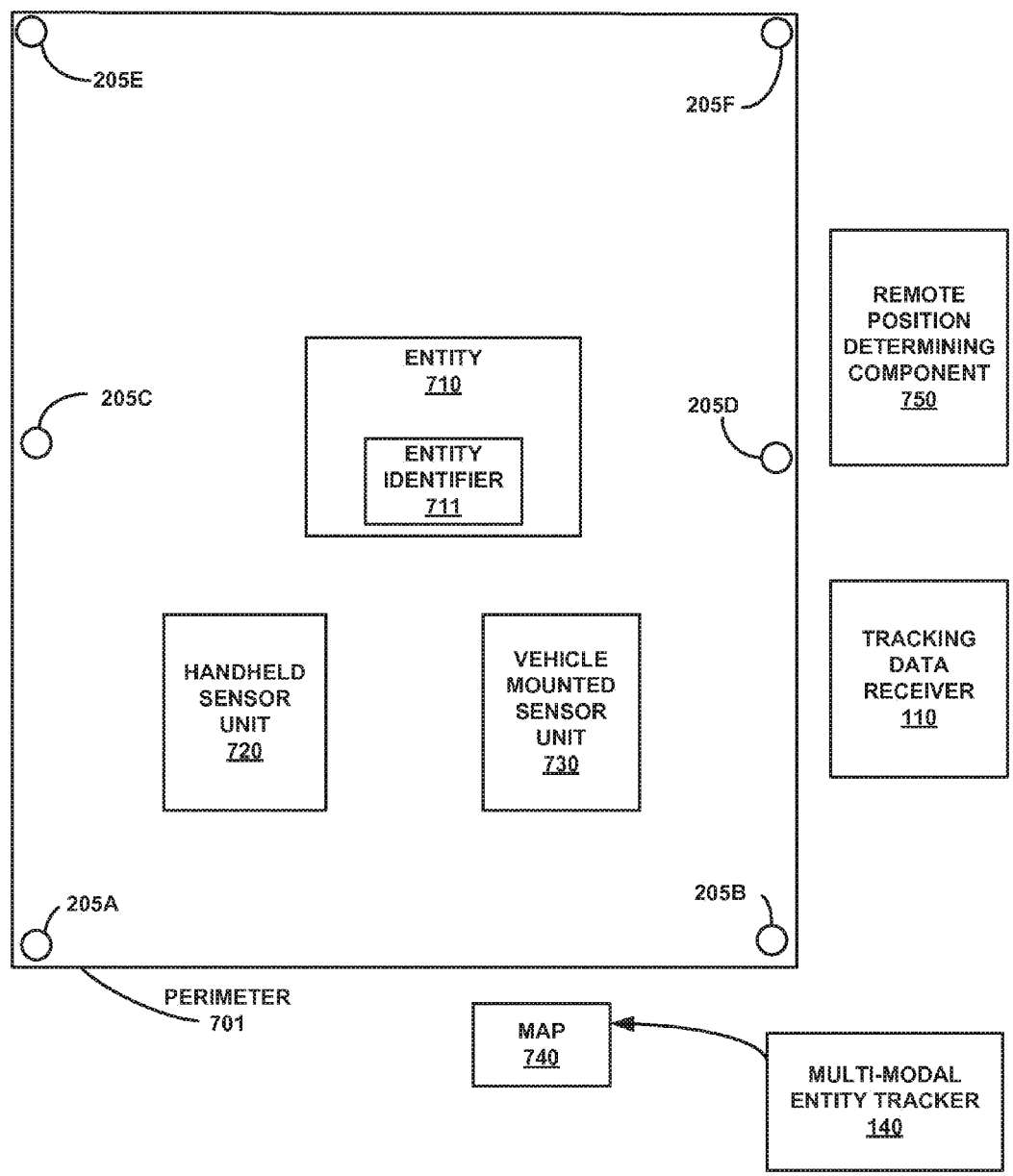
FIG. 7 is a diagram of an example site in accordance with an embodiment.

FIG. 7 is a diagram of an example site 700 in accordance with an embodiment. In one embodiment, FIG. 7 represents an equipment storage yard, which may also be referred to as a laydown yard. However, it is noted that embodiments of the present technology are not limited to tracking entities in an outdoor environment, or equipment storage yard, alone. Rather, an equipment storage yard is used to illustrate various embodiments. In FIG. 7, an equipment storage yard 700 is defined by a perimeter 701. The perimeter of equipment storage yard 700 is monitored by a plurality of sensors (e.g., 205A, 205B, 205C, 205D, 205E, and 205F) disposed at various locations of perimeter 701. In accordance with one or more embodiments, sensors 205A, 205B, 205C, 205D, 205E, and 205F are configured to detect a tracked entity 710 using any of the technologies described above with reference to FIG. 1 including, but not limited to, ultra high-frequency (UHF) radio-frequency identification (RFID), high-frequency (HF) RFID, near field communication (NFC), magnetic stripe, low-frequency (LF) RFID, barcode, quick response (QR) code, and GNSS position determination systems. In FIG. 7, entity 710 is configured with an entity identifier 711. In accordance with various embodiments, entity identifier comprises a passive RFID tag which is attached to equipment in equipment storage yard 700. In another embodiment, entity identifier 711 comprises a battery-assisted RFID tag. In another embodiment, entity identifier 711 comprises a near field communication (NFC) tag. In another embodiment entity identifier 711 comprises a barcode. In another embodiment, entity identifier 711 comprises a unique biometric that is identifiable at a distance of at least several meters, such as a facial arrangement of a human face. It is noted that the entity tracking can be accomplished using any of the entity identification technologies described above in accordance with various embodiments. Entity 710 can be any equipment, person, or article of interest. For example, entity 710 can be a vehicle, tool, implement, material, or machine part which is to be monitored, for example, for the purposes of inventory and loss prevention.

Also shown in FIG. 7 is a handheld sensor unit 720. In accordance with various embodiments, handheld sensor unit 720 comprises a handheld electronic device configured to detect entity identifier 711 using various wireless identification technologies as described above. Again, in one embodiment, handheld sensor unit 720 utilizes an RFID transceiver (e.g., 810 of FIG. 8) which generates a query and receives a query response from RFID tags (e.g., entity identifier 711 of FIG. 7) which are in communications range. However, in other embodiments, handheld sensor unit 720 may additionally or alternatively be equipped with other reader technologies such as an optical scanner for barcodes and/or biometrics and/or a near field communications tag reader. Also shown in FIG. 7 is a vehicle mounted sensor unit 730. As with handheld sensor unit 720, in one embodiment vehicle mounted sensor unit 730 utilizes an RFID transceiver (e.g., 850 of FIG. 8) which generates a query and receives a query response from RFID tags (e.g., entity identifier 711 of FIG. 7) which are in communications range. However, in other embodiments, vehicle mounted sensor unit 730 may additionally or alternatively be equipped with other reader technologies such as an optical scanner for barcodes and/or biometrics and/or a near field communications tag reader.

In accordance with one embodiment, the geographic location of sensors 205A, 205B, 205C, 205D, 205E, and 205F can be determined and recorded (e.g., in tracking data receiver 110 and/or multi-modal entity tracker 140) when the sensors are first put into place. In one embodiment, sensors 205A, 205B, 205C, 205D, 205E, and 205F communicate with tracking data receiver 110 and/or multi-modal entity tracker 140 via a wired communications link, a wireless communications link, or a hybrid communications link using both wired and wireless communication technology. In one embodiment, handheld sensor unit 720 and vehicle mounted sensor unit 730 communicate with tracking data receiver 110 using a wireless communication link. In another embodiment, handheld sensor unit 720 and/or vehicle mounted sensor unit 730 communicate directly with multi-modal entity tracker 140 via a wireless communication link. In accordance with various embodiments, handheld sensor unit 720 and vehicle mounted sensor unit 730 are used to identify entity 710 and to report its geographic location.

It is appreciated that, in various embodiments, different combinations and/or subsets of these sensors (205, 720, 730) may be present and/or utilized for entity tracking in an equipment storage yard 700 or other environment. For example, in some embodiments, only handheld sensor unit 720, vehicle mounted sensor unit, or sensor(s) 205 may be present and/or utilized for data collection. In other embodiments, in addition to handheld sensor unit 720 one or more of sensors 205 and/or vehicle mounted sensor unit 730 may be present and/or utilized. In other embodiments, in addition to vehicle mounted sensor unit 730 one or more of sensors 205 may be present and/or utilized.

Figure 8:
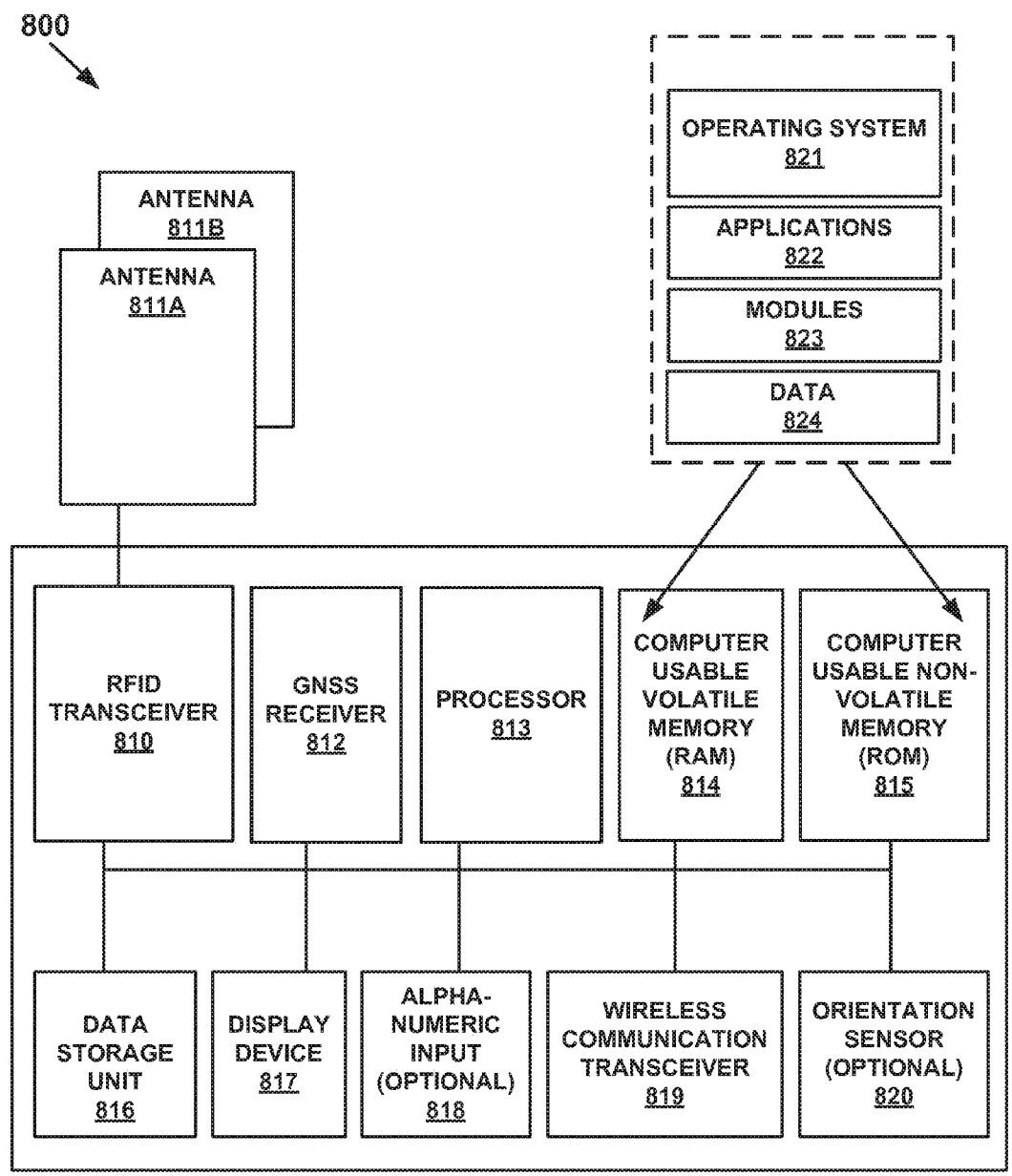
FIG. 8 shows an example sensor unit in accordance with an embodiment.

FIG. 8 shows an example sensor unit 800 in accordance with an embodiment. For the purpose of the following discussion, the components described below are understood to encompass embodiments of handheld sensor unit 720 and vehicle mounted sensor unit 730. In FIG. 8, sensor unit 800 comprises an RFID transceiver 810 which is coupled with one or more antennas (e.g., 811A and 811B). In one embodiment, RFID transceiver 810 is configured to selectively modulate the effective radiated power of antennas 811A and 811B. As will be discussed in greater detail below, this facilitates determining the distance from sensor unit 800 and entity 710 in accordance with various embodiments. In FIG. 8, sensor unit 800 further comprises a GNSS receiver 811. In some embodiments, when other sensing technologies are used, such as optical scanners/readers or near field transceivers, the scanning range may also be selectively modulated or focused within the direction of sensing and across the minimum/maximum sensing range of the utilized sensing technology.

In accordance with various embodiments, when sensor unit 800 receives a query response from entity identifier, such as entity identifier 711, a timestamp of this event is generated, for example, by GNSS receiver 811. Similarly in embodiments utilizing other sensing technologies or a combination of sensing technologies, a timestamp is generated when a barcode or an NFC tag associated with an entity is successfully read and/or when a biometric associated with a person is successfully identified. GNSS receiver 811 will also generate a set of coordinates of sensor unit 800 that is associated with the generated timestamp. As will be discussed in greater detail below, sensor unit 800 is configured to receive a plurality of query responses from entity identifier, such as entity identifier 711, which uniquely identifies entity 710. Based upon this plurality of query responses, sensor unit 800 can determine the distance to entity 710. Using this information, as well as the geographic coordinates of sensor unit 800 each time a query response is received, the geographic location of entity 710 can be determined. In accordance with various embodiments, the processing of data to derive the geographic location of entity 710 can be performed by sensor unit 800, or data (e.g., raw data or processed data) can be sent from sensor unit 800 to another device such as tracking data receiver 710 and/or multi-modal entity tracker 140 where the geographic location of entity 710 can be derived.

In FIG. 8, sensor unit 800 further comprises a processor 813 for processing information and instructions, a volatile memory 814 and a non-volatile memory 815 for storing information and instructions for processor 813, and a data storage device 816 (e.g., a magnetic or optical disk and disk drive) for storing information and instructions. It is noted that in accordance with one embodiment, sensor unit 800 is configured with a plurality of processors. In FIG. 8, sensor unit 800 further comprises a display device 817 for displaying information, and an optional alpha-numeric input device 818 including alphanumeric and function keys for communicating information and command selections to processor 813. It is noted that in one embodiment, display device 817 comprises a touch screen assembly which obviates the necessity for alpha-numeric input device 818. In FIG. 8, sensor unit 800 further comprises a wireless communication transceiver 819. In accordance with various embodiments, wireless communication transceiver 819 may be configured to operate on any suitable wireless communication protocol including, but not limited to: WiFi, WiMAX, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard). Personal area networks refer to short-range, and often low-data-rate, wireless communications networks. Also shown in FIG. 8 is an optional orientation sensor 820, such as an electronic compass, which is configured to determine the direction sensor unit 800 is pointed in relation to a given reference point.

Referring still to FIG. 8, various other components are depicted for handheld sensor unit 720. Specifically, when present, an operating system 821, applications 822, modules 823, and data 824 are shown as typically residing in one or some combination of computer usable volatile memory 814 (e.g., RAM), computer usable non-volatile memory 815 (e.g., ROM), and data storage unit 816. In some embodiments, all or portions of various embodiments described herein are stored, for example, as an application 821 and/or module 823 in memory locations within RAM 814, computer-readable storage media within data storage unit 816, peripheral computer-readable storage media (not shown), and/or other tangible computer readable storage media.

Example GNSS Receiver

Figure 9:
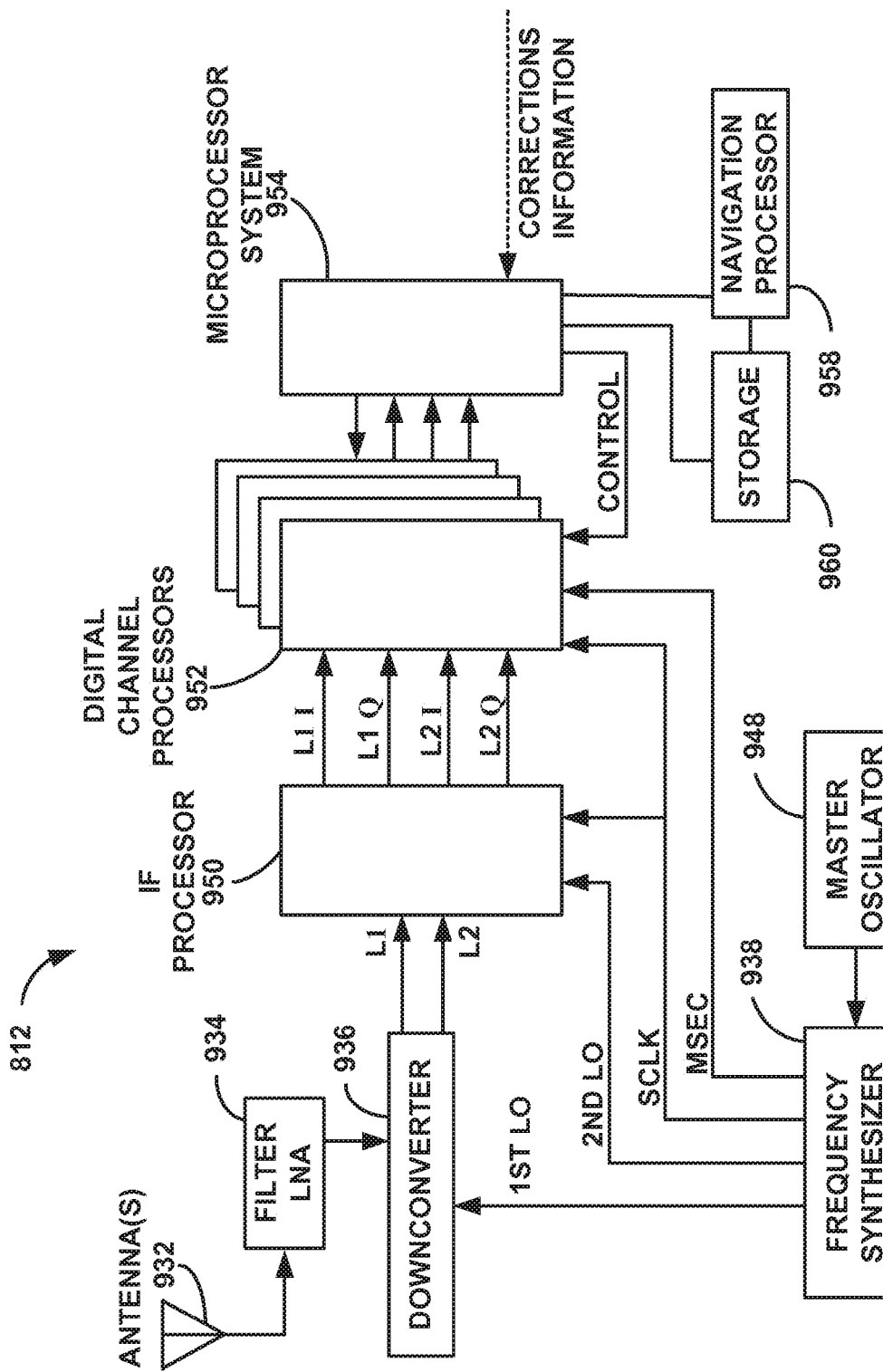
FIG. 9 is a block diagram of an example GNSS receiver used in accordance with various embodiments.

FIG. 9, shows an example GNSS receiver 812 in accordance with one embodiment. It is appreciated that different types or variations of GNSS receivers may also be suitable for use in the embodiments described herein. In some embodiments, a GNSS receiver such as GNSS receiver 900 may be coupled with or disposed as a portion of a handheld sensor unit 720 and vehicle mounted sensor unit 730.

As illustrated in FIG. 9, received L1 and L2 signals are generated by at least one GPS satellite. Each GPS satellite generates different signal L1 and L2 signals and they are processed by different digital channel processors 952 which operate in the same way as one another. FIG. 9 shows GPS signals (L1=1575.42 MHz, L2=1227.60 MHz) entering GNSS receiver 900 through one or more dual frequency antenna(a) 932. Antenna(s) 932 may be a magnetically mountable model commercially available from Trimble Navigation of Sunnyvale, Calif. Master oscillator 948 provides the reference oscillator which drives all other clocks in the system. Frequency synthesizer 938 takes the output of master oscillator 948 and generates important clock and local oscillator frequencies used throughout the system. For example, in one embodiment frequency synthesizer 938 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 934 performs filtering and low noise amplification of both L1 and L2 signals. The noise figure of GNSS receiver 900 is dictated by the performance of the filter/LNA combination. The downconvertor 936 mixes both L1 and L2 signals in frequency down to approximately 175 MHz and outputs the analogue L1 and L2 signals into an IF (intermediate frequency) processor 950. IF processor 950 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively. At least one digital channel processor 952 inputs the digitally sampled L1 and L2 inphase and quadrature signals. All digital channel processors 952 are typically are identical by design and typically operate on identical input samples. Each digital channel processor 952 is designed to digitally track the L1 and L2 signals produced by one satellite by tracking code and carrier signals and to from code and carrier phase measurements in conjunction with the microprocessor system 954. One digital channel processor 952 is capable of tracking one satellite in both L1 and L2 channels. Microprocessor system 954 is a general purpose computing device which facilitates tracking and measurements processes, providing pseudorange and carrier phase measurements for a navigation processor 958. In one embodiment, microprocessor system 954 provides signals to control the operation of one or more digital channel processors 952. Navigation processor 958 performs the higher level function of combining measurements in such a way as to produce position, velocity and time information for the differential and surveying functions. Storage 960 is coupled with navigation processor 958 and microprocessor system 954. It is appreciated that storage 960 may comprise a volatile or non-volatile storage such as a RAM or ROM, or some other computer readable memory device or media. In one rover receiver embodiment, navigation processor 958 performs one or more of the methods of position correction.

In some embodiments, microprocessor 954 and/or navigation processor 958 receive additional inputs for use in refining position information determined by GNSS receiver 900. In some embodiments, for example, corrections information is received and utilized. By way of non-limiting example, such corrections information can include differential GPS corrections, RTK corrections, and/or wide area augmentation system (WAAS) corrections.

Figure 10:
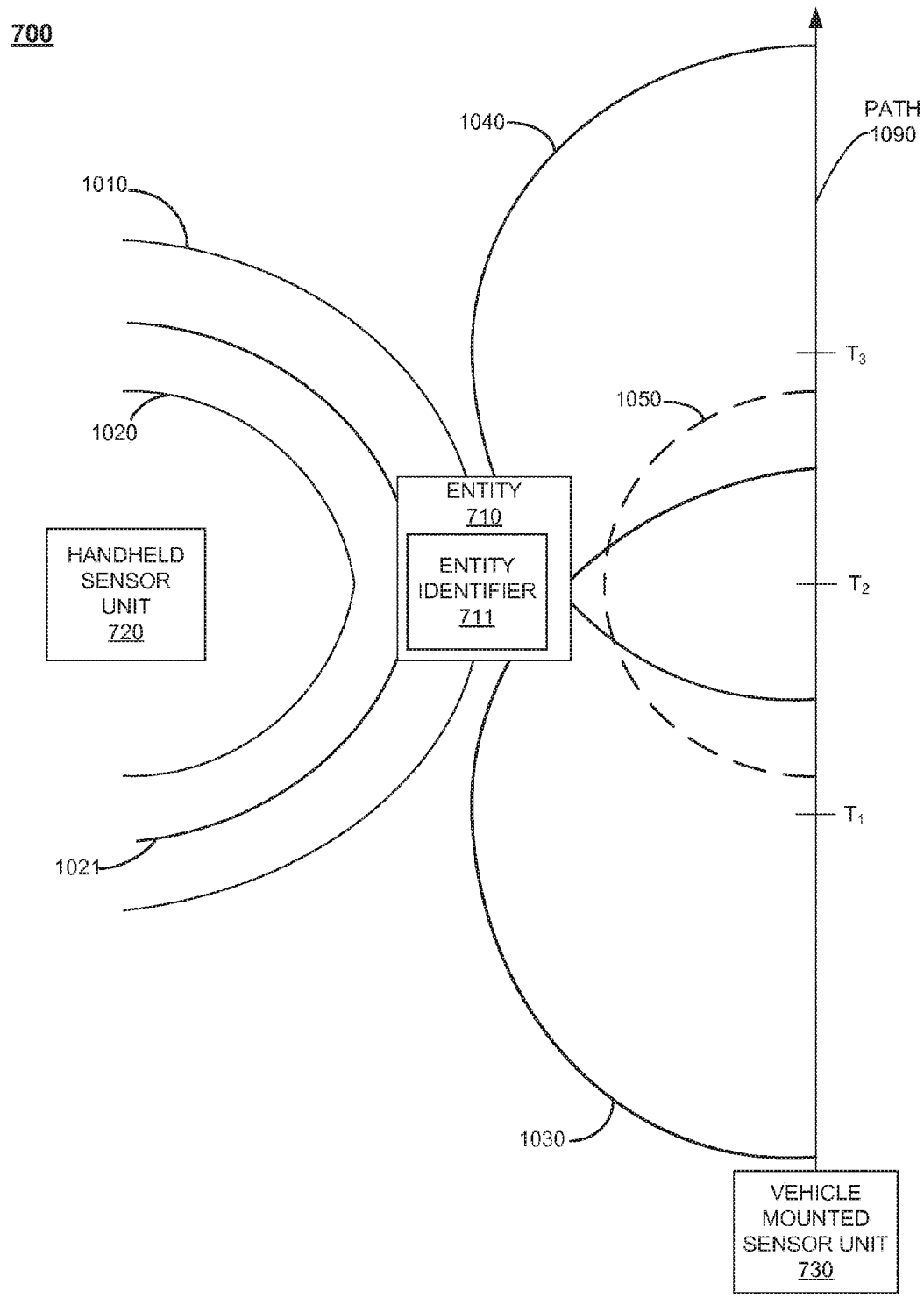
FIG. 10 shows detection of a tracked entity in accordance with various embodiments.

FIG. 10 shows detection of a tracked entity in accordance with various embodiments. In FIG. 10, a user operating handheld sensor unit 720 detects the presence of entity 710. In one embodiment, RFID transceiver 810 of handheld sensor unit 720 performs regular polling to detect RFID tags and/or other entity identifiers in its vicinity. Thus, by way of example and not of limitation, in response to an RFID query, entity identifier 711 will return a query response to handheld sensor unit 720 which is received by an RFID transceiver. Adjusting the effective radiated power of an antenna (e.g., 811A of FIG. 8) affects the range at which it can communicate with RFID tags. Consider an example where RFID transceiver 810 is transmitting a query at 30 millidecibels (dBm) and handheld sensor unit 720 is able to detect entity identifier 711 at a distance of 3.0 meters, as shown by arc 1010 of FIG. 10. As described above, when handheld sensor unit 720 receives a query reply from entity identifier 711, it will generate a timestamp of that event using either of GNSS receiver 812 or processor 813. GNSS receiver 812 will also automatically generate a first geographic position of handheld sensor unit 720 at that time. In a similar fashion, when other sensing technologies such as barcode scanners, NFC transceivers, or biometric scanners are additionally or alternatively utilized, timestamps are generated in response to detection of associated entity identifiers along with GNSS positions associates with the respective timestamps.

In accordance with one embodiment, sensor unit 800 (e.g., handheld sensor unit 720 or vehicle mounted sensor unit 730) will then generate a second query at a lower effective radiated power (e.g., as shown by arc 1020 of FIG. 10). Thus, for the purpose of illustration, arc 1020 represents the detection range of RFID transceiver 810 when the effective radiating power has been reduced to 20 dBm. For the purpose of illustration, arc 1020 extends, for example, 20 meters from handheld sensor unit 720. In accordance with various embodiments, sensor unit 800 is configured to generate a timestamp when no query reply is received by RFID transceiver 810 after a first query reply has been received. Thus, by receiving no reply to a second query, handheld sensor unit 720 can determine that entity identifier 711 is more than 20 meters from its present location, and somewhere in the vicinity of 30 meters or less from its present location. In one embodiment, handheld sensor unit 720 will incrementally increase the effective radiating power from RFID transceiver 810 until a query reply from entity identifier 711 is again received. In accordance with various embodiments, the effective radiating power from RFID transceiver 810 is dynamically controlled (e.g., by processor 813) without user intervention, Thus, in FIG. 10 the effective radiating power of RFID transceiver 810 has been raised to, for example, 25 dBm (e.g., arc 1021) and a query reply has again been received from entity identifier 711. Assuming arc 1021 represents a radius of for example 25 meters, handheld sensor unit 720 can determine that entity 710 is approximately 25 meters from the current geographic position of handheld sensor unit 720 when the query reply represented by arc 1021 was received. In accordance, the orientation of handheld sensor unit 720 can be used to further increase the precision of determining the geographic position of entity 710. For example, the radiation pattern of antenna 811A typically has a main lobe which exhibits the greatest field strength. In accordance with various embodiments, knowledge of the axis of this main lobe and where it is pointed, using for example orientation sensor 820, facilitates determining the location of entity 710 with greater precision. As discussed above, in accordance with various embodiments, GNSS receiver 812 comprises a high-precision GNSS receiver which can utilize corrections data such as differential GPS corrections, RTK corrections, and/or wide area augmentation system (WAAS) corrections to determine the geographic position of handheld sensor unit 720 with sub-meter precision. It is noted that a query reply from entity identifier 711 may comprise a variety of information such as, but not limited to, a unique identification sequence, a name of an entity, a description of an entity, a status of an entity, or other usable information.

In another embodiment, vehicle mounted sensor unit 730 is disposed on a vehicle driving along path 1090. In accordance with various embodiments, vehicle mounted sensor unit 730 can be mounted upon any type of vehicle which is used in, or near, equipment storage yard 700 and is not limited to data collection vehicles alone. In one embodiment, antennas 811A and 811B are disposed upon opposite sides of a vehicle (e.g., left and right sides) and the signals to and from RFID transceiver 810 are multiplexed to antennas 811A and 811B. In one embodiment, an indication of which antenna (e.g., either 811A or 811B) is included with the query reply from entity identifier 711. In some embodiments, it is appreciated that a vehicle mounted sensor unit 730 may utilize only a single antenna 811 or more than two antennas 811. Other sensing technologies described herein may be similarly directed and/or multiplexed when collecting data.

Additionally, the direction in which antennas 811A and 811B are pointed can be inferred using, for example, orientation sensor 820. In another embodiment, the heading of a vehicle as it moves along path 1090 can be inferred by successive GNSS position measurements such as at $T_1$ and $T_3$ shown in FIG. 10. In another embodiment, GNSS receiver 812 can be coupled with two or more antennas 932, such as at the front and rear of a vehicle, and the heading of the vehicle can be determined based upon the difference of locations of the antennas.

In another embodiment, a remote sensing system (e.g., remote position determining component 750) can determine the geographic position of the vehicle carrying vehicle mounted sensor unit 730 when query replies are received from entity identifier 711. For example, remote position determining component 750 can comprise an optical total station which is configured to determine its geographic position, an azimuth to the vehicle carrying vehicle mounted sensor unit 730, and a range to the vehicle using a laser range finder.

By knowing and/or determining the spatial relationship between a utilized position determining component (750, 812, etc.) and the RFID transceiver 810 in vehicle mounted sensor unit 730, the position of the mounted sensor unit 730 can be determined. Based on the positions of mounted sensor unit 730 at multiple different sensing locations, the position of entity 710 can be derived based upon query replies received by RFID transceiver 810. In a similar fashion, when other sensing technologies such as barcode scanners, NFC transceivers, or biometric scanners are additionally or alternatively utilized, the position of the mounted sensor unit 730 can be similarly be determined. Similar techniques can be utilized for determining the position of an entity 710 based on replies received or entity identifiers that are identified when other sensing technologies such as barcode scanners, NFC transceivers, or biometric scanners are additionally or alternatively utilized.

In FIG. 10, as vehicle mounted sensor unit 730 is conveyed along path 1090 it periodically generates RFID queries in order to poll RFD tags which may be in range. As discussed above, in one embodiment, two or more antennas are multiplexed with RFID transceiver 810 so that at a first interval antenna 811A is energized and at a second interval antenna 811B is energized. With respect to FIG. 10 and path 1090, for purposes of example, antenna 811A is disposed such that it radiates leftward with respect to path 1090 while antenna 811B is disposed such that it radiates rightward with respect to path 1090; and only radiation of antenna 811A is illustrated.

As shown in FIG. 10, at time $T_1$, RFID transceiver 810 detects a query reply from entity identifier 711. Again, when the query reply is received at time $T_1$, a timestamp is appended to the information sent by entity identifier 711 as well as an identification of which antenna (e.g., antenna 811A) received the query reply. At a second time interval $T_3$, RFID transceiver 810 receives another query reply from entity identifier 711. This information, as well as the geographic position of vehicle mounted sensor unit 730 at that time, as well as the direction in which the vehicle is moving, is sent to processor 813. Again, the information conveyed in the query reply is appended with a timestamp and an identification of the antenna which received the query reply (e.g., antenna 811A). This information, as well as the geographic position of vehicle mounted sensor unit 730 at that time, as well as the direction in which the vehicle is moving, is sent to processor 813. In accordance with one embodiment, processor 813 can use this information to determine the geographic position of entity 710 by triangulation. In one embodiment, processor 813 is used to determine the geographic position of entity 710 based upon this data and the known spatial relationship between RFID transceiver 810 and GNSS receiver 812 (e.g., that they are co-located or that they are located a known distance and orientation apart from one another). Alternatively, the spatial relationship between the GNSS receiver located with remote position determining component 750 and the RFID transceiver 810 disposed with vehicle mounted sensor unit 730 can be determined and used to determine the geographic position of entity 710. Alternatively, remote position determining component 750 may monitor the vehicle carrying vehicle mounted sensor unit 730 and during later processing the geographic position of vehicle mounted sensor unit 730 can be derived at the moment it receives a query response from entity identifier 711.

As discussed above, the effective radiated power of the antenna which received the query reply can be used in further refining the determination of the geographic position of entity 710. For example, if antenna 811A has an effective radiated power of 30 dBm when a query reply is received from entity identifier 711, and the known maximum reception range at that power is 30 meters, it can be deduced that entity 710 is within 30 meters of vehicle mounted sensor unit 730 at both time $T_1$ and $T_3$. It can also be seen that at any time less that T1 or greater than T3, entity identifier 711 was not detectable at this maximum reception range of vehicle mounted sensor unit 730. Thus, in one embodiment detection at times $T_1$ and $T_3$ represent first and last detections of entity identifier 711 at the maximum transmitting power of vehicle mounted sensor unit 730. Using this information further facilitates determining the geographic position of entity 710. Additionally, vehicle mounted sensor unit 730 can selectively modulate the effective radiated power of antenna 811A in response to receiving a query reply from entity identifier 711 as described above with reference to handheld sensor unit 720. Thus, at time $T_2$, RFID transceiver has lowered the effective radiating power of antenna 811A to, for example, 10 dBm and is not able to detect a query reply from entity identifier 711. Assuming that it is known that at 10 dBm RFID transceiver has an effective range of approximately 10 meters, it can be deduced that at time $T_2$, entity 710 was at least more than 10 meters away from vehicle mounted sensor unit 730, but within 30 meters of vehicle mounted sensor unit at times $T_1$ and $T_3$. Also, as described above with reference to handheld sensor unit 720, RFID transceiver 810 can increase its effective radiated power until it again receives a query reply from entity identifier 711 to further refine the resolution of the geographic position of entity 710. Although power modulation is shown only at the position on path 1090 that is represented by time $T_3$, it is appreciated that power modulation may also be utilized at the positions marked by $T_1$ and $T_2$ and/or at other positions along path 1090 in order to better or more quickly resolve the location of entity identifier 711.

In accordance with various embodiments, vehicle mounted sensor unit 730 can determine the geographic position of entity 710 independently, or send data to tracking data receiver 110 or multi-modal entity tracker 140 for further processing. The position may be determined by techniques such as triangulation and interpolation (based upon regions where entity identifier has been detected or is known not to have been detected). Additionally, data Can be sent from remote position determining component 750 to facilitate determining the geographic position of entity 710. Referring again to FIG. 7, in one embodiment, a map 740 is generated based upon data from handheld sensor unit 720 and/or vehicle mounted sensor unit 730. For example, a map with an overlay of the locations of detected entities 710 can be generated. While FIG. 7 shows map 740 being generated by multi-modal entity tracker 140, in another embodiment, map 740 can be a display upon, for example, display device 817 of FIG. 8 and/or 618 of FIG. 6.

Figure 12A:
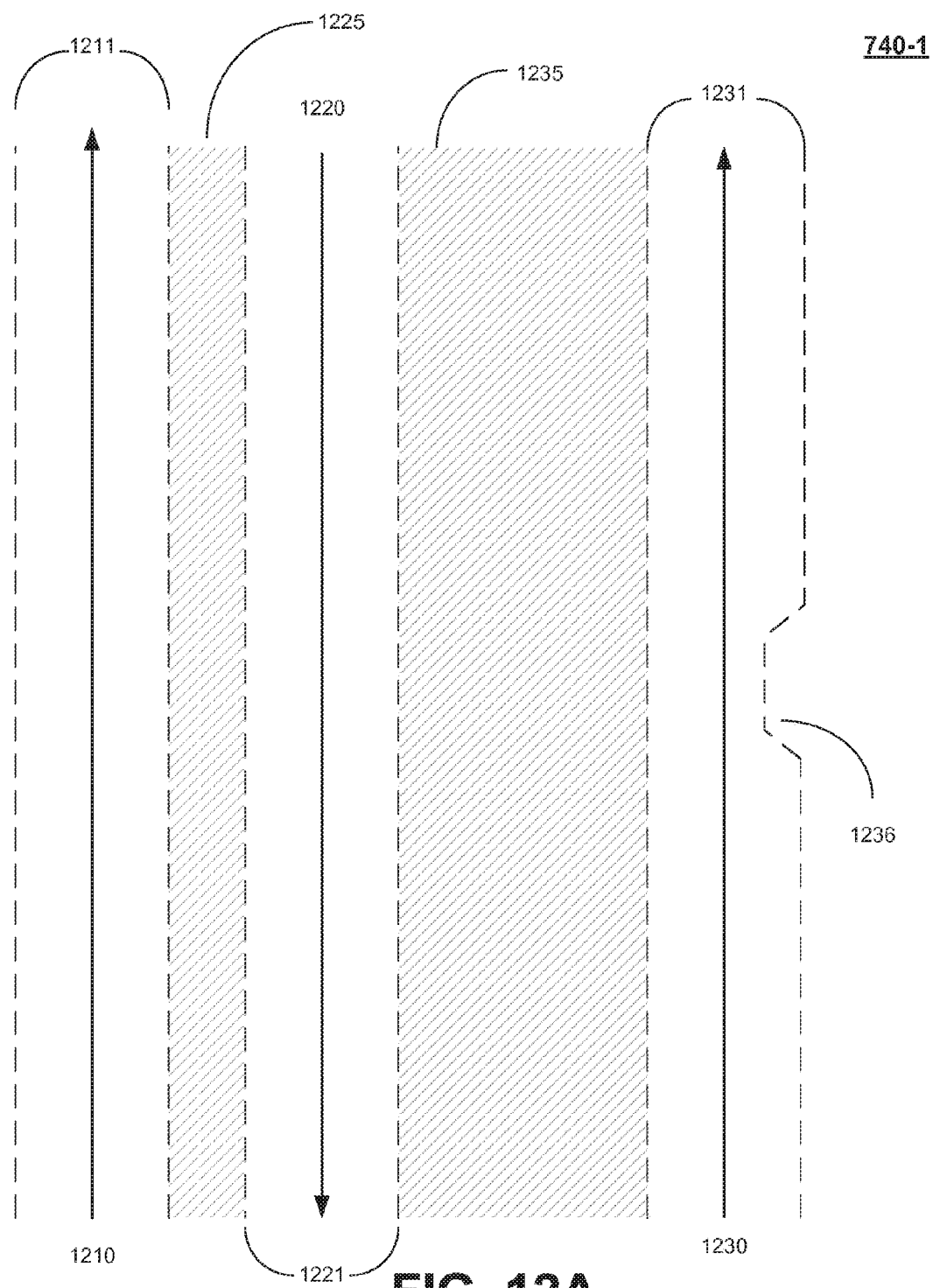
FIG. 12A shows an example map generated in accordance with various embodiments.

Referring now to FIG. 12A, a map 740-1 showing a plurality of paths (e.g., 1210, 1220, and 1230) followed by a vehicle traversing equipment storage yard 700 carrying vehicle mounted sensor unit 730 is shown. Also shown in FIG. 12A are swaths (e.g., 1211, 1221, and 1231) showing the coverage area of RFID transceiver 810 as the vehicle moved along paths 1210, 1220, and 1230 respectively. In other words, swaths 1211, 1221, and 1231 show the range of RFID transceiver 810 to both sides of the vehicle based upon the effective radiated power provided to the antennas coupled with it. As discussed above, the effective radiated power affects the range at which RFID transceiver 810 can detect an RFID tag such as entity identifier 711. As shown in FIG. 12A, there are gaps in the coverage areas such as gap 1225 and 1235. This can be due to a variety of factors, but shows that there may be tracked entities within these areas which are not detectable by vehicle mounted sensor unit 730. This may indicate the necessity for an operator to be sent to these region with a handheld sensor unit 720 to search for entities which may not otherwise show up. Also shown in FIG. 12A is a region 1236 in which the effective radiating power to one of antennas 811A or 811B has been reduced. This may be in response to having received a query response from an entity identifier 711 (not shown). In accordance with various embodiments, map 740-1 can show all of the swaths of all vehicles which have traversed equipment storage yard 700 within a given time frame. For example, all of the vehicles which have traversed equipment storage yard 700 in the past week can be shown. In one embodiment, various time periods can be color coded to show coverage areas on a given day. Thus, the swath(s) from Monday (e.g., 1211) can be color coded green, the swath(s) from Tuesday (e.g., swaths 1221 and 1231) can be color coded yellow, etc. These can all be overlaid to show which areas have not been covered in the last week. Again, this facilitates dispatching either a vehicle mounted sensor unit 730 or handheld sensor unit 720 to areas which may not have been polled for tracked entities within the last week to generate a more complete understanding of what tracked entities are present and their location.

Figure 12B:
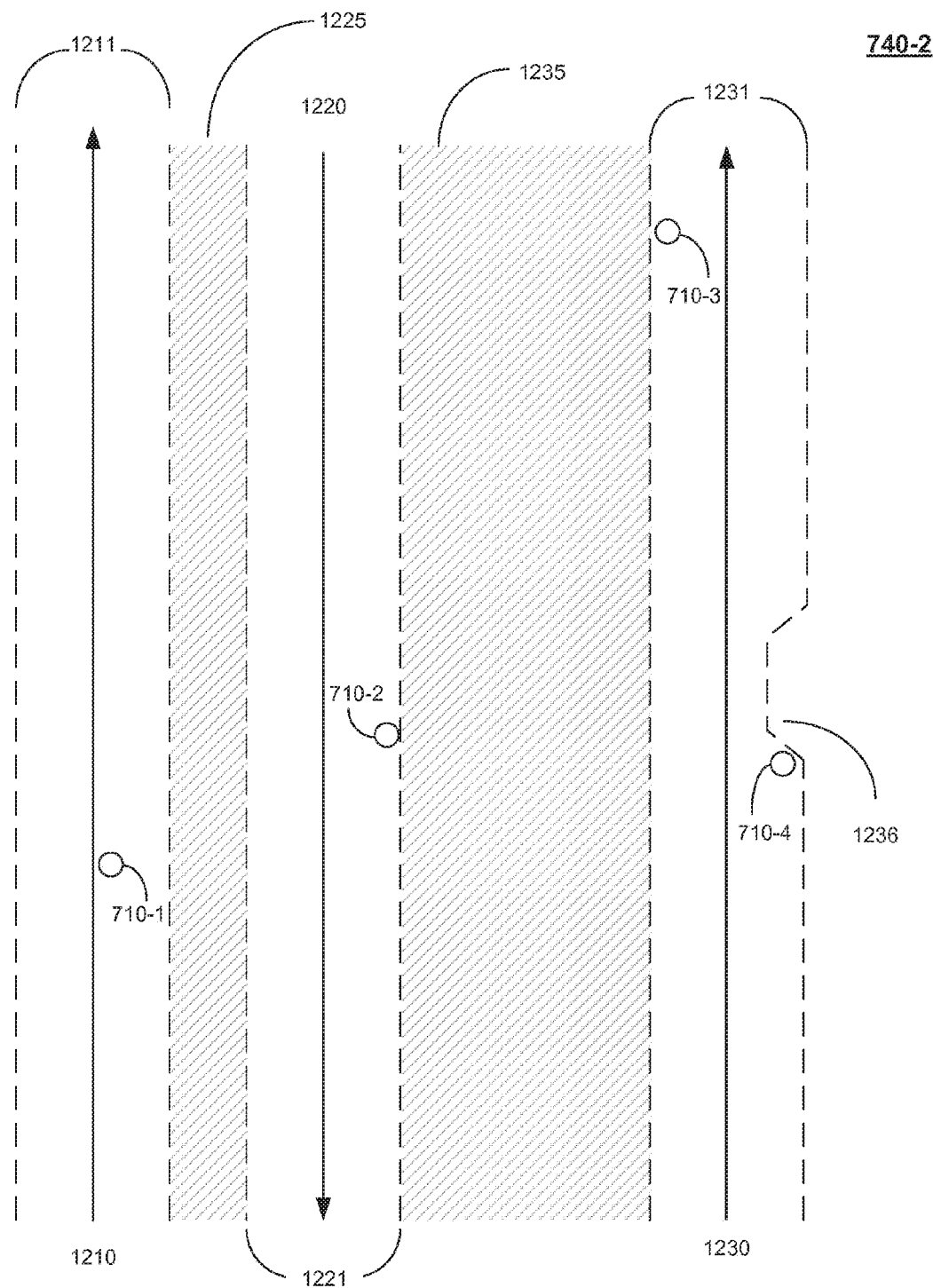
FIG. 12B shows an example map generated in accordance with various embodiments.

FIG. 12B illustrates a map 740-2 showing a plurality of paths (e.g., 1210, 1220, and 1230) followed by a vehicle traversing equipment storage yard 700 carrying vehicle mounted sensor unit 730 is shown. along with the locations of entities 710 (710-1, 710-2, 710-3, 710-4, etc.) that are associated with detected entity identifiers 711.

Figure 13:
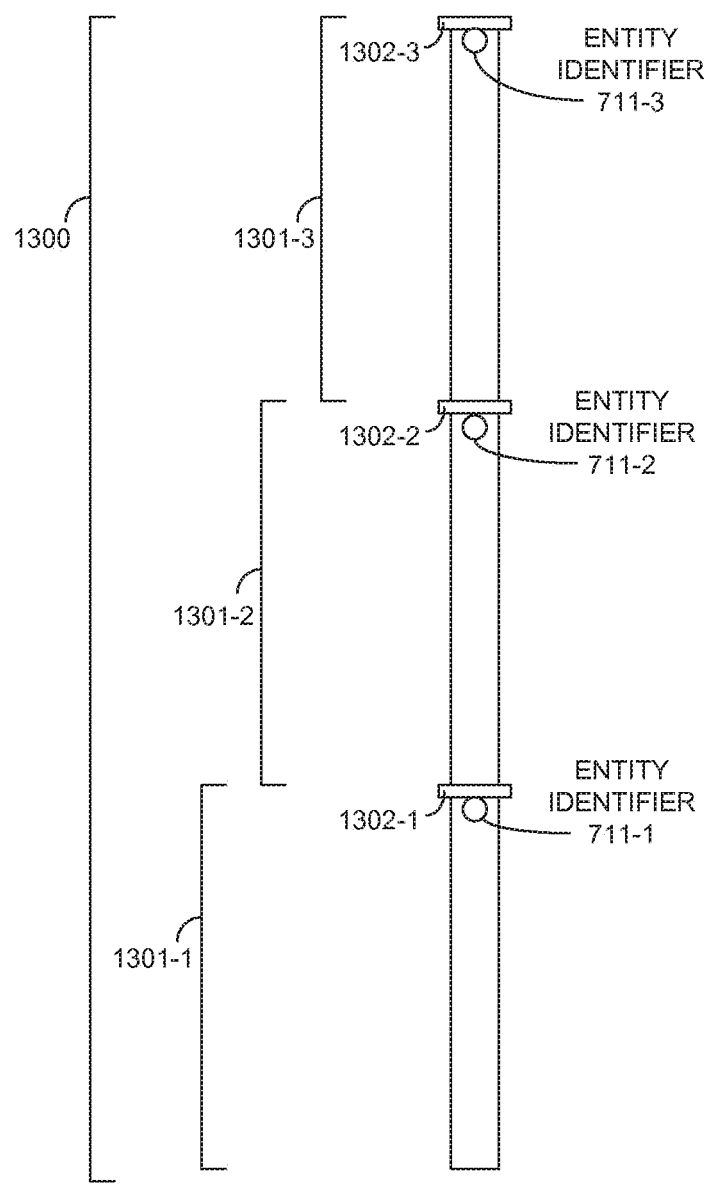
FIG. 13 shows an example pipeline, in accordance with an embodiment.

FIG. 13 illustrates a pipeline 1300. Pipeline 1300 includes pipe sections 1301 (1301-1, 1301-2, 1301-3). Each pipe section includes a respective flange 1302 or joint where it joins with another pipe section in pipeline 1300. For example, pipe section 1301-1 includes pipe flange 1302-1, pipe section 1301-2 includes pipe flange 1302-2, and pipe section 1301-3 includes flange 1302-3. As can be seen in FIG. 13, entity identifiers 711 are located near the respective flanges (entity identifier 711-1 near flange 1302-1, entity identifier 711-2 near flange 1302-2, and entity identifier 711-3 near flange 1302-3).

Figure 14:
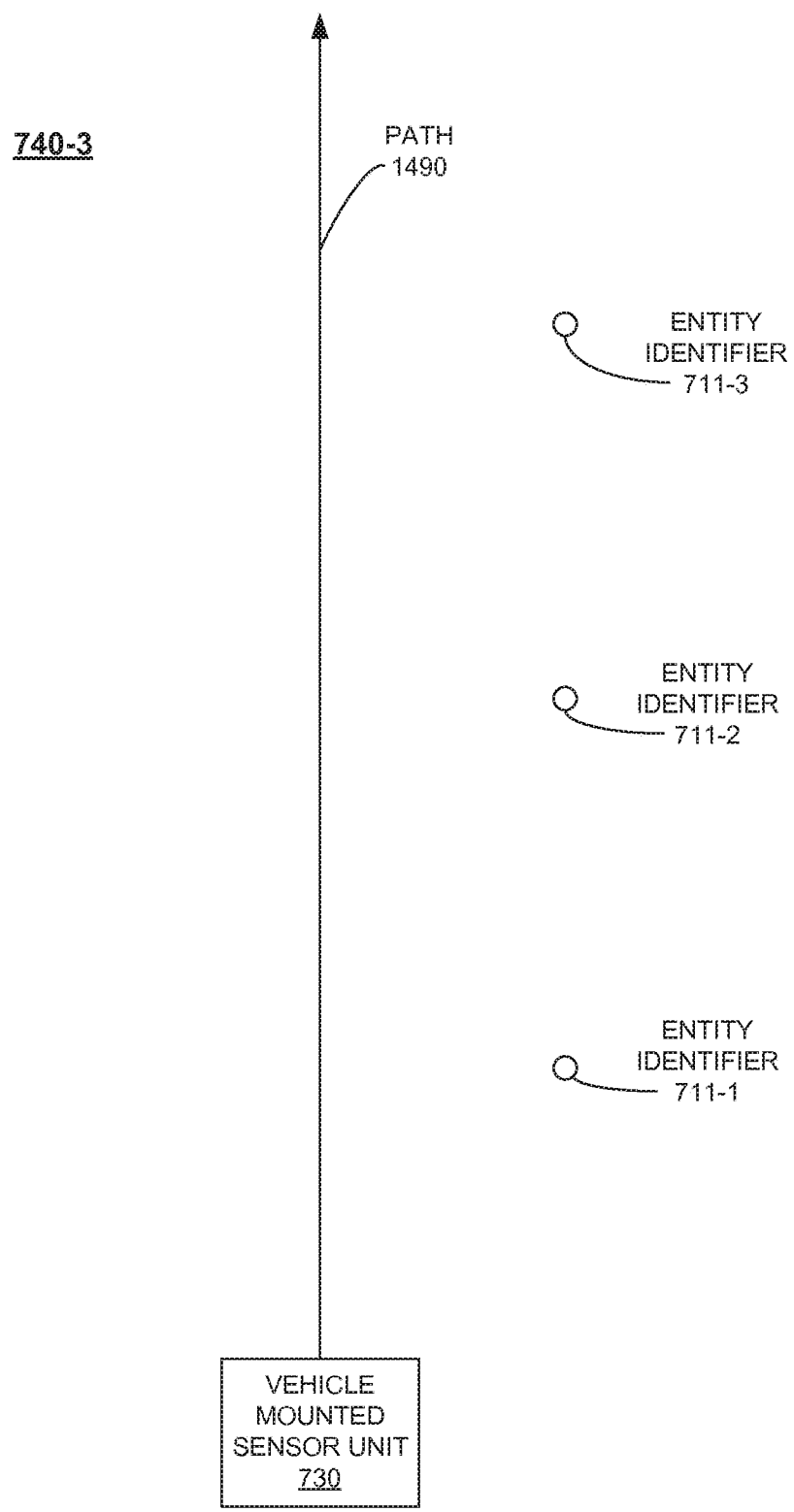
FIG. 14 shows an example map generated in accordance with various embodiments.

FIG. 14 shows an example map 740-3 generated in accordance with various embodiments. As depicted in FIG. 14, a vehicle mounted sensor unit 730 has been taken along path 1490 along pipeline 1300 and has detected and located entity identifiers 711-1, 711-2, and 711-3, which correspond to and depict the location(s) of installed pipeline components (which may be above ground or buried). In a similar manner, entity identifiers 711 can be left on building components after they are emplaced at a construction site and/or after they have been used in construction of a building. For example, entity identifiers may be left upon emplaced on one or more of a variety of components including, but not limited to: conduit, reinforcement bar, joists, beams, studs, electrical fittings, electrical enclosures, and plumbing fittings.

Referring again to FIGS. 13 and 14, in this manner, if an entity identifier 711 is placed at each joint of pipe segments comprising a pipeline, the location of the pipeline can also be recorded as it is installed using, for example, handheld sensor unit 720 to record the geographic position of each entity identifier 711 as the pipeline is laid. Additionally, at a later time after the pipeline has been laid, it can be detected using, for example, a vehicle mounted sensor unit 730 which can drive in the vicinity of the pipeline and detect the entity identifiers 730 as it passes by. In a similar fashion other locations of other types of emplaced components can be recorded during their emplacement. Also, the map 740-3 can show the current state completion of a project or the states of completion of a project over time by overlaying/combining results from more than one instance of entity identification. In accordance with various embodiments, map 740 can show a 2-D map of the installed components, a 2-D map with the addition of time, a 3-D map, a 3-D map with the addition of time, or other displays.

FIG. 11 is a flowchart of a method for tracking an entity in accordance with various embodiments. In operation 1110, a plurality of messages is received conveying an identification of an entity using a wireless identification component (e.g., RFID transceiver 810 of FIG. 8) of a sensor unit. As discussed above, in various embodiments, RFID transceiver 810 receives query replies from entity identifier 711. As described above, entity identifier 711 can utilize a variety of wireless technologies to convey the identity of entity 710, and other information, to RFID transceiver 810. In one embodiment, sensor unit 800 receives a first query reply at a first location (e.g., $T_1$ of FIG. 10) and a second query reply at a second location (e.g., $T_3$ of FIG. 10). In another embodiment, a plurality of query replies can be received by a sensor unit 800 while it is at the same location.

In operation 1120 of FIG. 11, a geographic location of the wireless identification component is determined by a position determining component (e.g., GNSS receiver 812 of FIG. 8) of the sensor unit wherein the geographic location describes a respective geographic location of the wireless identification component when each of the plurality of messages is received. As described above, when a query reply from entity identifier 711 is received, a timestamp is generated (e.g., by GNSS receiver 812 or processor 813) and is appended with the query reply. Also, GNSS receiver 812 determines the geographic location of sensor unit 800 (e.g., handheld sensor unit 720, or vehicle mounted sensor unit 730) and appends that information with query reply. This facilitates determining the geographic position of entity 710. In another embodiment, remote position determining component 750 of FIG. 7 is configured to generate a geographic location of sensor unit 800 when a query reply is received from entity identifier 711. Remote position determining component 750 then determines an angular measurement and distance to sensor unit 800 which will facilitate determining the geographic position of entity 710. In other words data points are collected when query replies from entity identifier 711 are received at RFID transceiver 810 which are used to determine the geographic position of entity 710.

In operation 1130 of FIG. 11, a geographic position of the entity is determined based upon a known spatial relationship between the position determining component and the wireless identification component. As described above, in one embodiment, RFID transceiver 810 and GNSS receiver 812 are co-located in the same sensor unit (e.g., handheld sensor unit 720, or vehicle mounted sensor unit 730). In another embodiment, remote position determining component 750 monitors the position of sensor unit 800 from a distance. In accordance with various embodiments, based upon the known spatial relationship between the position determining component being used (e.g., remote position determining component 750 or GNSS receiver 812) and RFID transceiver 810, the geographic position of entity 710 can be determined. In accordance with various embodiments, the determination of the geographic position of entity 710 can be facilitated by determining the orientation of the antenna coupled with RFID transceiver 810. As discussed above, the radiation pattern emanating from antennas 811A and 811B can exhibit a main lobe. If the axis of this main lobe is known, knowledge of the direction in which this main lobe is pointed when a query reply is received from entity identifier 711 can be used to further refine determining the geographic position of entity 710. Additionally, in one embodiment, the effective radiating power of antennas 811A and/or 811B can be selectively modulated to determine a minimum distance of entity identifier 711 from sensor unit 800. As described above, in one or more embodiments, a plurality of antennas (e.g., 811A and 811B of FIG. 8) can be coupled with RFID transceiver 810 and their signals multiplexed. In one embodiment, when one of antennas 811A or 811B receives a query reply from entity identifier 711, the antenna which received the query reply is identified and this information is appended to the data conveyed in the query reply. Again, this can facilitate determining the geographic position of entity 710.

In accordance with various embodiments, a map (e.g., map 740) can be generated which shows the geographic position of entity 710. Additionally, map 740 can show the location of an installed component as discussed with reference to FIGS. 13 and 14. In various embodiments, the generated map 740 can include a static 2-D map, a 2-D map with the added dimension of time, a static 3-D map, a 3-D map with the added dimension of time, etc. Additionally, with reference to FIG. 12A, map 740 can display areas which are not covered by RFID transceiver 810 (e.g., areas 1225 and 1235 of FIG. 12A). In various embodiments, a generated map 740 is displayed or provided to a device which may display it.

Although the example use of RFID technology has been used for purposes of description, it is appreciated that other sensing technologies may be used in place of or in combination with RFID sensing technology for entity location and mapping. For example, a combination of RFID sensing and barcode scanning technologies may be used to locate and map entities in the manner described herein, likewise a combination of RFID and NFC technologies may be utilized to perform locate and map entities, likewise a combination of RFID and biometric technologies may be used to locate and map entities, likewise a combination of barcode and NFC technologies may be used to locate and map entities. Moreover, several technologies may be used together to locate and map entities in the manner described herein; for example: RFID, NFC, barcode, biometric technologies other technologies described herein may all be utilized to locate and map entities, and the technologies may be used at separate times or in conjunction with one another. That is, all or some combination of technologies may be present in a common sensor unit (e.g., handheld sensor unit 720, or vehicle mounted sensor unit 730) used during a sensing pass or sensing activity and/or single or subsets of the technologies may be present in a in a common sensor unit (e.g., handheld sensor unit 720, or vehicle mounted sensor unit 730) and a map may be generated by utilizing data acquired during multiple sensing passes or sensing activities using different technologies for sensing entity identifiers.

Embodiments of the present technology are thus described. While the present technology has been described in particular embodiments, it should be appreciated that the present technology should not be construed as limited to these embodiments alone, but rather construed according to the following claims.

What is claimed is:

1. An entity tracking system comprising:
a wireless identification component configured to receive a plurality of messages conveying an identification of an entity;

a position determining component configured to determine a plurality of corresponding geographic locations of the wireless identification component, wherein each of the plurality of corresponding geographic locations being a respective geographic location of the wireless identification component when each of the plurality of messages is received; and a processor configured to:
determine a plurality of corresponding geographic positions of the entity based on the plurality of corresponding geographic locations of the wireless identification component and a known spatial relationship defining a distance and orientation between the position determining component and the wireless identification component, wherein each of the plurality of corresponding geographic positions of the entity being a respective geographic position of the entity when each of the plurality of messages is received; and detect a change in geographic position of the entity based on the plurality of corresponding geographic positions of the entity.

2. The entity tracking system of claim 1, wherein the processor is further configured to determine that the entity is being stolen based on the detected change in geographic position of the entity.

3. The entity tracking system of claim 1, wherein the processor is further configured to generate a notification in response to detecting the change in geographic position of the entity.

4. The entity tracking system of claim 1, wherein the entity has an active RFID tag attached thereon and configured to transmit the plurality of messages.

5. The entity tracking system of claim 1, wherein the wireless identification component implements a Bluetooth standard.

6. The entity tracking system of claim 1, wherein the entity has a motion sensor attached thereon for sensing motion events of the entity, and the plurality of messages convey the motion events of the entity, and wherein the processor is configured to report the motion events of the entity.

7. The entity tracking system of claim 1, wherein:
the wireless identification component is further configured to receive a second plurality of messages conveying an identification of a second entity; and
the processor is further configured to determine a co-movement of the entity and the second entity based on the detected change in geographic position of the entity and the second plurality of messages.

8. A method for tracking and protecting an entity, the method comprising:
receiving a plurality of messages conveying an identification of an entity using a wireless identification component of a sensor unit;
determining, using a position determining component of the sensor unit, a plurality of corresponding geographic locations of the wireless identification component, wherein each of the plurality of corresponding geographic locations being a respective geographic location of the wireless identification component when each of the plurality of messages is received; and
determining a plurality of corresponding geographic positions of the entity based on the plurality of corresponding geographic locations of the wireless identification component and a known spatial relationship defining a distance and orientation between the position determining component and the wireless identification component, wherein each of the plurality of corresponding geographic positions of the entity being a respective geographic position of the entity when each of the plurality of messages is received; and
detecting a change in geographic position of the entity based on the plurality of corresponding geographic positions of the entity.

9. The method of claim 8, wherein the processor is further configured to determine that the entity is being stolen based on the detected change in geographic position of the entity.

10. The method of claim 8, wherein the processor is further configured to generate a notification in response to detecting the change in geographic position of the entity.

11. The method of claim 8, wherein the entity has an active RFID tag attached thereon and configured to transmit the plurality of messages.

12. The method of claim 8, wherein the wireless identification component implements a Bluetooth standard.

13. The method of claim 8, wherein the entity has a motion sensor attached thereon for sensing motion events of the entity, and the plurality of messages convey the motion events of the entity, and wherein the processor is configured to report the motion events of the entity.

14. The method of claim 8, further comprising:
receiving a second plurality of messages conveying an identification of a second entity using the wireless identification component of the sensor unit; and
determining a co-movement of the entity and the second entity based on the detected change in geographic position of the entity and the second plurality of messages.

15. An entity tracking system comprising:
a wireless identification component configured to receive a plurality of messages conveying an identification of an entity;
a position determining component configured to determine a plurality of corresponding geographic locations of the wireless identification component, wherein each of the plurality of corresponding geographic locations being a respective geographic location of the wireless identification component when each of the plurality of messages is received; and
a processor configured to:
determine a plurality of corresponding geographic positions of the entity based on the plurality of corresponding geographic locations of the wireless identification component and a known spatial relationship defining a distance and orientation between the position determining component and the wireless identification component, wherein each of the plurality of corresponding geographic positions of the entity being a respective geographic position of the entity when each of the plurality of messages is received; and
detect an increase in distance between the entity and the wireless identification component based on the plurality of corresponding geographic positions of the entity and the plurality of corresponding geographic locations of the wireless identification component.

16. The entity tracking system of claim 15, wherein the wireless identification component resides in a mobile device.

17. The entity tracking system of claim 15, wherein the processor is further configured to generate a notification in response to the detected increase in distance between the entity and the wireless identification component.

18. The entity tracking system of claim 15, wherein the entity has an active RFID tag attached thereon and configured to transmit the plurality of messages.

19. The entity tracking system of claim 15, wherein the wireless identification component implements a Bluetooth standard.

20. The entity tracking system of claim 15, wherein the entity has a motion sensor attached thereon for sensing motion events of the entity, and the plurality of messages convey the motion events of the entity, and wherein the processor is further configured to report the motion events of the entity.

* * * * *